(12) United States Patent
Ko et al.

(10) Patent No.: US 8,948,289 B2
(45) Date of Patent: Feb. 3, 2015

(54) METHOD AND DEVICE FOR CODEBOOK GENERATION AND DOWNLINK SIGNAL TRANSMISSION IN A WIRELESS COMMUNICATION SYSTEM SUPPORTING MULTIPLE ANTENNAS

(75) Inventors: Hyun Soo Ko, Anyang-si (KR); Moon Il Lee, Anyang-si (KR); Jae Hoon Chung, Anyang-si (KR); Bin Chul Ihm, Anyang-si (KR); Seung Hyun Kang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 112 days.

(21) Appl. No.: 13/521,211

(22) PCT Filed: Jan. 12, 2011

(86) PCT No.: PCT/KR2011/000219
§ 371 (c)(1),
(2), (4) Date: Jul. 9, 2012

(87) PCT Pub. No.: WO2011/087275
PCT Pub. Date: Jul. 21, 2011

(65) Prior Publication Data
US 2013/0129008 A1    May 23, 2013

Related U.S. Application Data

(60) Provisional application No. 61/294,408, filed on Jan. 12, 2010.

(30) Foreign Application Priority Data

Jan. 12, 2011    (KR) ........................ 10-2011-0003046

(51) Int. Cl.
*H04B 7/02*    (2006.01)
*H04L 1/02*    (2006.01)
(Continued)

(52) U.S. Cl.
CPC ............ *H04B 7/0456* (2013.01); *H04B 7/0473* (2013.01); *H04B 7/0639* (2013.01); *H04B 7/0469* (2013.01); *H04B 7/0465* (2013.01); *H04B 7/0478* (2013.01)
USPC ............ 375/267; 375/260; 455/132; 455/504

(58) Field of Classification Search
None
See application file for complete search history.

(56) References Cited

U.S. PATENT DOCUMENTS

2007/0274253 A1* 11/2007 Zhang et al. .................. 370/328
2007/0274411 A1* 11/2007 Lee et al. ...................... 375/267
(Continued)

OTHER PUBLICATIONS

S.A. Mujtaba, et al., "Standardization of MIMO-OFDM Technology," Globecom 2007 Tutorial, Nov. 26, 2007, See pp. 36-40.
(Continued)

*Primary Examiner* — Kabir A Timory
*Assistant Examiner* — Gina McKie
(74) *Attorney, Agent, or Firm* — McKenna Long & Aldridge LLP

(57) ABSTRACT

The present invention relates to a method in which a base station transmits a downlink signal using 8 antennas may comprise the steps of: mapping a downlink signal to N (1≤N≤4) layers; precoding the signal mapped to the N layers, by using a specific precoding matrix selected from a pre-stored codebook; subjecting the precoded signal to processing for OFDM symbol generation; and transmitting OFDM symbols through 8 antennas. The pre-stored codebook may comprise precoding matrices for the respective ranks corresponding to N, the pre-stored codebook may consist of 16 codebook indexes, and a portion of the precoding matrices for high ranks in the 16 codebook indexes may be generated from the precoding matrices for low ranks.

8 Claims, 21 Drawing Sheets

(51) Int. Cl.
*H04B 7/04* (2006.01)
*H04B 7/06* (2006.01)

(56) References Cited

U.S. PATENT DOCUMENTS

2009/0262695 A1 10/2009 Chen et al.
2010/0238824 A1* 9/2010 Farajidana et al. ........... 370/252
2013/0343216 A1* 12/2013 Su et al. ........................ 370/252

OTHER PUBLICATIONS

J. Lee et al., "MIMO Technologies in 3GPP LTE and LTE-Advanced," EURASIP Journal on Wireless Communications and Networking, vol. 2009, pp. 1-10, Dec. 31, 2009.

* cited by examiner (a)

(b)

(a)

(b)

(c)

METHOD AND DEVICE FOR CODEBOOK GENERATION AND DOWNLINK SIGNAL TRANSMISSION IN A WIRELESS COMMUNICATION SYSTEM SUPPORTING MULTIPLE ANTENNAS

This Application is a 35 U.S.C. §371 National Stage Entry of International Application No. PCT/KR2011/000219, filed Jan. 12, 2011 and claims the benefit of U.S. Provisional Application Nos. 61/294,408, filed Jan. 12, 2010, and Korean Application No: 10-2011-0003046, filed Jan. 12, 2011, all of which are incorporated by reference in their entirety herein.

TECHNICAL FIELD

The present invention relates to a wireless communication system, and more particularly, to a codebook configuration in a multi-antenna supportive wireless communication system and a method and apparatus for transmitting a downlink signal.

BACKGROUND ART

MIMO (multi-input multi-output) technology means a method of improving data transceiving efficiency by adopting multiple transmitting antennas and multiple receiving antennas instead of a single transmitting antenna and a single receiving antenna. In particular, this technology increases capacity or enhances performance using multiple antennas in a transmitting or receiving end of a wireless communication system. This MIMO technology may be called multi-antenna technology.

In order to support MIMO transmission, it may be able to use a precoding matrix to appropriately distribute transmission information to each antenna in accordance with a channel status and the like. In the conventional 3GPP ($3^{rd}$ generation partnership project) LTE (long term evolution) system, maximum 4 transmitting antennas are supported for downlink transmission and a corresponding precoding codebook is defined.

DISCLOSURE OF THE INVENTION

Technical Task

In the conventional 3GPP LTE system (e.g., system by 3GPP LTE Release-8 or -9 standard), a codebook is designed to support maximum 4 transmitting antennas in downlink (DL). In 3GPP LTE-A system evolved from the conventional 3GPP LTE, introduction of an extended antenna configuration is taken into consideration for advanced capacity (e.g., advanced spectral efficiency) and the ongoing discussion is made to support maximum 8 transmitting antennas in DL. In order to provide high throughput, Closed-Loop MIMO scheme may be usable for DL 8 antenna transmission. In case of Closed-Loop MIMO transmission by FDD (frequency division duplex), it may be able to consider applying codebook based Closed-Loop MIMO. Hence, it may be requested to design a precoding codebook that provides good capacity for DL transmission via maximum 8 transmitting antennas.

The technical task of the present invention is to provide a codebook configuration and a data transmitting method and apparatus, by which an extended antenna configuration can be supported in DL MIMO transmission.

Moreover, when a codebook is designed, generally required are constant modulus property, finite alphabet, restriction on a codebook size, nested property, and providing good capacity for various antenna configurations. Therefore, according to the present invention, the technical task is to provide a codebook design scheme, by which good capacity for 8-transmitting antenna precoding can be provided in single-cell DL transmission by satisfying the above-mentioned general requirements for the codebook design.

Technical tasks obtainable from the present invention are non-limited the above-mentioned technical task. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of transmitting a downlink signal, which is transmitted by a base station using 8 antennas, according to one embodiment of the present invention may include the steps of mapping the downlink signal to N layers ($1 \leq N \leq 4$), precoding the signal mapped to the N layers using a specific precoding matrix selected from a previously stored codebook, performing a processing for OFDM symbol configuration on the precoded signal, and transmitting OFDM symbol via the 8 antennas, wherein the previously stored codebook includes precoding matrixes respectively corresponding to N ranks, wherein the previously stored codebook includes 16 codebook indexes, and wherein a portion of the precoding matrix for a high rank for each of the 16 codebook indexes includes the precoding matrix for a low rank.

To further achieve these and other advantages and in accordance with the purpose of the present invention, a method of receiving a downlink signal, which is received from a base station by a user equipment, according to another embodiment of the present invention may include the steps of receiving the downlink signal transmitted via 8 antennas by being mapped to N layers ($1 \leq N \leq 4$) from the base station and processing the received signal using a specific precoding matrix selected from a previously stored codebook, wherein the previously stored codebook includes precoding matrixes respectively corresponding to N ranks, wherein the previously stored codebook includes 16 codebook indexes, and wherein a portion of the precoding matrix for a high rank for each of the 16 codebook indexes includes the precoding matrix for a low rank.

To further achieve these and other advantages and in accordance with the purpose of the present invention, a base station device, which transmitting a downlink signal, according to a further embodiment of the present invention may include 8 antennas configured for signal transmission and reception, a memory storing a codebook used to transmit a signal mapped to at least one layer via the 8 antennas, and a processor configured to process a transmission of the downlink signal by being connected to the antennas and the memory, the processor including a layer mapper mapping the downlink signal to N layers ($1 \leq N \leq 4$), a precoder precoding the signal mapped to the N layers using a specific precoding matrix selected from a previously stored codebook, and a transmitting module performing a processing for OFDM symbol configuration on the precoded signal, the transmitting module transmitting the processed signal via the 8 antennas, wherein the codebook includes precoding matrixes respectively corresponding to N ranks, wherein the codebook includes 16 codebook indexes, and wherein a portion of the precoding matrix for a high rank for each of the 16 codebook indexes includes the precoding matrix for a low rank.

To further achieve these and other advantages and in accordance with the purpose of the present invention, a user equipment device, which receives a downlink signal from a base station, according to another further embodiment of the present invention may include a signal transceiving antenna, a memory storing a codebook used to receive the downlink signal transmitted via 8 antennas by being mapped to N layers ($1 \leq N \leq 4$) from the base station, and a processor processing a reception of the downlink signal by being connected to the antenna and the memory, the processor configured to process the received signal using a specific precoding matrix selected from a codebook stored in the memory, wherein the codebook includes precoding matrixes respectively corresponding to N ranks, wherein the previously stored codebook includes 16 codebook indexes, and wherein a portion of the precoding matrix for a high rank for each of the 16 codebook indexes includes the precoding matrix for a low rank.

According to the various embodiments of the present invention, the precoding matrixes of codebook indexes 1 to 8 for a rank 2 may have linear configuration in the previously stored codebook and the precoding matrixes of codebook indexes 9 to 16 for the rank 2 may have block diagonal configuration in the previously stored codebook.

According to the various embodiments of the present invention, the precoding matrixes of the codebook indexes 1 to 8 a the rank 1 transmission may include different column vectors of a prescribed 8×8 matrix in the previously stored codebook, respectively and the precoding matrixes of the codebook indexes 9 to 16 for the rank 1 transmission may include different column vectors of a matrix permutated from the prescribed 8×8 matrix in the previously stored codebook, respectively.

According to the various embodiments of the present invention, the codebook may include

| Codebook Index | Rank 1 | Rank 2 | Rank 3 | Rank 4 |
|---|---|---|---|---|
| 1 | [$W_1(1)$] | [$W_1(1)\ W_1(2)$] | [$W_1(1)\ W_1(2)\ W_1(3)$] | [$W_1(1)\ W_1(2)\ W_1(3)\ W_1(4)$] |
| 2 | [$W_1(2)$] | [$W_1(2)\ W_1(3)$] | [$W_1(2)\ W_1(3)\ W_1(4)$] | [$W_1(2)\ W_1(3)\ W_1(4)\ W_1(5)$] |
| 3 | [$W_1(3)$] | [$W_1(3)\ W_1(4)$] | [$W_1(3)\ W_1(4)\ W_1(5)$] | [$W_1(3)\ W_1(4)\ W_1(5)\ W_1(6)$] |
| 4 | [$W_1(4)$] | [$W_1(4)\ W_1(5)$] | [$W_1(4)\ W_1(5)\ W_1(6)$] | [$W_1(4)\ W_1(5)\ W_1(6)\ W_1(7)$] |
| 5 | [$W_1(5)$] | [$W_1(5)\ W_1(6)$] | [$W_1(5)\ W_1(6)\ W_1(7)$] | [$W_1(5)\ W_1(6)\ W_1(7)\ W_1(8)$] |
| 6 | [$W_1(6)$] | [$W_1(6)\ W_1(7)$] | [$W_1(6)\ W_1(7)\ W_1(8)$] | [$W_1(6)\ W_1(7)\ W_1(8)\ W_1(1)$] |
| 7 | [$W_1(7)$] | [$W_1(7)\ W_1(8)$] | [$W_1(7)\ W_1(8)\ W_1(1)$] | [$W_1(7)\ W_1(8)\ W_1(1)\ W_1(2)$] |
| 8 | [$W_1(8)$] | [$W_1(8)\ W_1(1)$] | [$W_1(8)\ W_1(1)\ W_1(2)$] | [$W_1(8)\ W_1(1)\ W_1(2)\ W_1(3)$] |
| 9 | [$W_4(1)$] | [$W_2(1)\ W_2(2)$] | [$W_2(1)\ W_2(2)\ W_4(2)$] | [$W_2(1)\ W_2(2)\ W_2(3)\ W_2(4)$] |
| 10 | [$W_4(2)$] | [$W_2(3)\ W_2(4)$] | [$W_2(3)\ W_2(4)\ W_4(4)$] | [$W_2(3)\ W_2(4)\ W_2(5)\ W_2(6)$] |
| 11 | [$W_4(3)$] | [$W_2(5)\ W_2(6)$] | [$W_2(5)\ W_2(6)\ W_4(6)$] | [$W_2(5)\ W_2(6)\ W_2(7)\ W_2(8)$] |
| 12 | [$W_4(4)$] | [$W_2(7)\ W_2(8)$] | [$W_2(7)\ W_2(8)\ W_4(8)$] | [$W_2(7)\ W_2(8)\ W_2(1)\ W_2(2)$] |
| 13 | [$W_4(5)$] | [$W_3(1)\ W_3(2)$] | [$W_3(1)\ W_3(2)\ W_4(1)$] | [$W_3(1)\ W_3(2)\ W_3(3)\ W_3(4)$] |
| 14 | [$W_4(6)$] | [$W_3(3)\ W_3(4)$] | [$W_3(3)\ W_3(4)\ W_4(3)$] | [$W_3(3)\ W_3(4)\ W_3(5)\ W_3(6)$] |
| 15 | [$W_4(7)$] | [$W_3(5)\ W_3(6)$] | [$W_3(5)\ W_3(6)\ W_4(5)$] | [$W_3(5)\ W_3(6)\ W_3(7)\ W_3(8)$] |
| 16 | [$W_4(8)$] | [$W_3(7)\ W_3(8)$] | [$W_3(7)\ W_3(8)\ W_4(7)$] | [$W_3(7)\ W_3(8)\ W_3(1)\ W_3(2)$], |

$W_1$, $W_2$, $W_3$ and $W_4$ may include $$W_1 = DFT_{8\times 8}$$

$$W_2 = P^T \begin{bmatrix} D_1 & 0 \\ 0 & D_1 \end{bmatrix} P,$$

where $$D_1 = DFT_{4\times 4}$$

$$W_3 = P^T \begin{bmatrix} D_2 & 0 \\ 0 & D_2 \end{bmatrix} P,$$

where $$D_2 = \mathrm{diag}[1, e^{\pi j/4}, e^{\pi j/2}, e^{3\pi j/4}] DFT_{4\times 4},$$

and $$W_4 = P^T W_1,$$

it may be P=[$e_1\ e_5\ e_2\ e_6\ e_3\ e_7\ e_4\ e_8$], $e_k$ ($1 \leq k \leq 8$) is a unitary vector having a non-zero value for a $k^{th}$ element, $DFT_{4\times 4}$ and $DFT_{8\times 8}$ may include $$DFT_{4\times 4} = \frac{1}{\sqrt{4}} \begin{bmatrix} 1 & 1 & 1 & 1 \\ 1 & j & -1 & -j \\ 1 & -1 & 1 & -1 \\ 1 & -j & -1 & j \end{bmatrix}$$

and $$DFT_{8\times 8} = \frac{1}{\sqrt{8}} \begin{bmatrix} w^0 & w^0 & w^0 & w^0 & w^0 & w^0 & w^0 & w^0 \\ w^0 & w^1 & w^2 & w^3 & w^4 & w^5 & w^6 & w^7 \\ w^0 & w^2 & w^4 & w^6 & w^8 & w^{10} & w^{12} & w^{14} \\ w^0 & w^3 & w^6 & w^9 & w^{12} & w^{15} & w^{18} & w^{21} \\ w^0 & w^4 & w^8 & w^{12} & w^{16} & w^{20} & w^{24} & w^{28} \\ w^0 & w^5 & w^{10} & w^{15} & w^{20} & w^{25} & w^{30} & w^{35} \\ w^0 & w^6 & w^{12} & w^{18} & w^{24} & w^{30} & w^{36} & w^{42} \\ w^0 & w^7 & w^{14} & w^{21} & w^{28} & w^{35} & w^{42} & w^{49} \end{bmatrix}$$

where, $$w = e^{-\frac{2\pi i}{8}},$$

respectively.

The above-mentioned general description of the present invention and the following details of the present invention are exemplary and may be provided for the additional description of the invention disclosed in claims.

Advantageous Effects

According to the present invention, a codebook configuration and a data transmitting method and apparatus can be provided to support an extended antenna configuration in DL MIMO transmission. Moreover, according to the present invention, when a codebook is designed, by satisfying such requirement as constant modulus property, finite alphabet, restriction on a codebook size, nested property, and providing good capacity for various antenna configurations, a codebook for providing good capacity for 8-transmitting antenna precoding can be provided in single-cell DL transmission.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Figure 1:
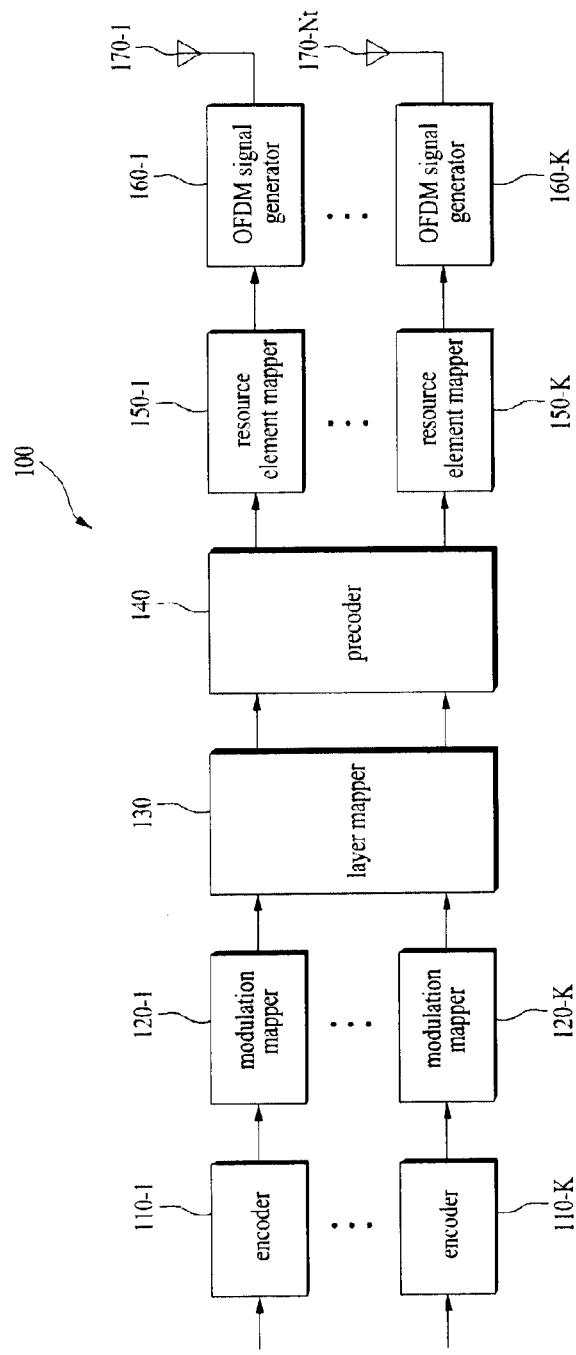
FIG. 1 is a block diagram for a structure of a transmitter including multiple antennas.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In this disclosure, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like. In this disclosure, a terminology 'base station' may be usable as including a cell or sector conceptionally. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into another form within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE system or 3GPP LTE-A system, by which the technical idea of the present invention may be non-limited.

FIG. 1 is a block diagram for a structure of a transmitter including multiple antennas. A transmitter shown in FIG. 1 may include a base station as a DL transmission entity or a user equipment as a UL transmission entity.

Referring to FIG. 1, a transmitter 100 encoders 110-1 to 110-K, modulation mappers 120-1 to 120-K, a layer mappers 130, a precoder 140, resource element mappers 150-1 to 150-K, and OFDM signal generators 160-1 to 160-K. And, the transmitter 100 includes Nt transmitting antennas 170-1 to 170-Nt.

Each of the encoders 110-1 to 110-K encodes an inputted data by a predetermined coding scheme and then generates a coded data. Each of the modulation mappers 120-1 to 120-K maps the coded data to a modulation symbol that represents a position on a signal constellation. No limitation is put on a modulation scheme. And, the modulation scheme may include m-PSK (m-phase shift keying) or m-QAM (m-quadrature amplitude modulation). For instance, the m-PSK may include one of BPSK, QPSK and 8-PSK. For instance, the m-QAM may include one of 16-QAM, 64-QAM and 256-QAM.

The layer mapper 130 defines a layer of a modulation symbol to enable the precoder 140 to distribute an antenna-specific symbol to the path of each of the antennas. In this case, the layer is defined as an information path inputted to the precoder 140. And, the information path before the precoder 140 may be called a virtual antenna or a layer.

The precoder 140 outputs an antenna-specific symbol by processing the modulation symbol by MIMO scheme according to the multiple transmitting antennas 170-1 to 170-Nt. The precoder 140 distributes a specific symbol to each of the resource element mappers 150-1 to 150-K on the path of the corresponding antenna. Each information path sent by the precoder 140 to one antenna may be called a stream. This may be regarded as a physical antenna.

Each of the resource element mappers 150-1 to 150-K allocates the antenna-specific symbol to a proper resource element and multiplexes it in accordance with a user. Each of the OFDM signal generators 160-1 to 160-K outputs OFDM symbol by modulating the antenna-specific symbol by OFDM scheme. Each of the OFDM signal generators 160-1 to 160-K may be able to perform IFFT (inverse fast Fourier transform) on the antenna-specific symbol. And, a cyclic prefix (CP) may be inserted in a time-domain symbol on which IFFT is performed. The CP is the signal inserted in a guard interval to remove inter-symbol interference due to the multiple paths in OFDM transmission scheme. And, OFDM symbol is transmitted via each of the transmitting antenna 170-1 to 170-Nt.

Figure 2:
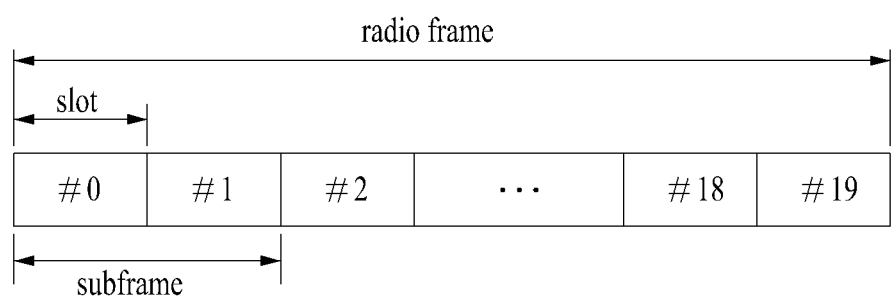
FIG. 2 is a diagram for a structure of a radio frame used in 3GPP LTE system.

FIG. 2 is a diagram for a structure of a radio frame used in 3GPP LTE system. One radio frame includes 10 subframes and one subframe includes 2 slots in time domain. A time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain. Since 3GPP LTE system uses OFDMA scheme in DL, the OFDM symbol indicates one symbol length (period). And, one symbol may be called SC-FDMA symbol or symbol length in UL. A resource block (RB) is a resource allocation unit and includes a plurality of contiguous subcarriers in one slot. The above-described radio frame structure is just exemplary. Hence, the number of subframes included in one radio frame, the number of slots included in one subframe or the number of OFDM symbols included in one slot may be changed in various ways.

Figure 3:
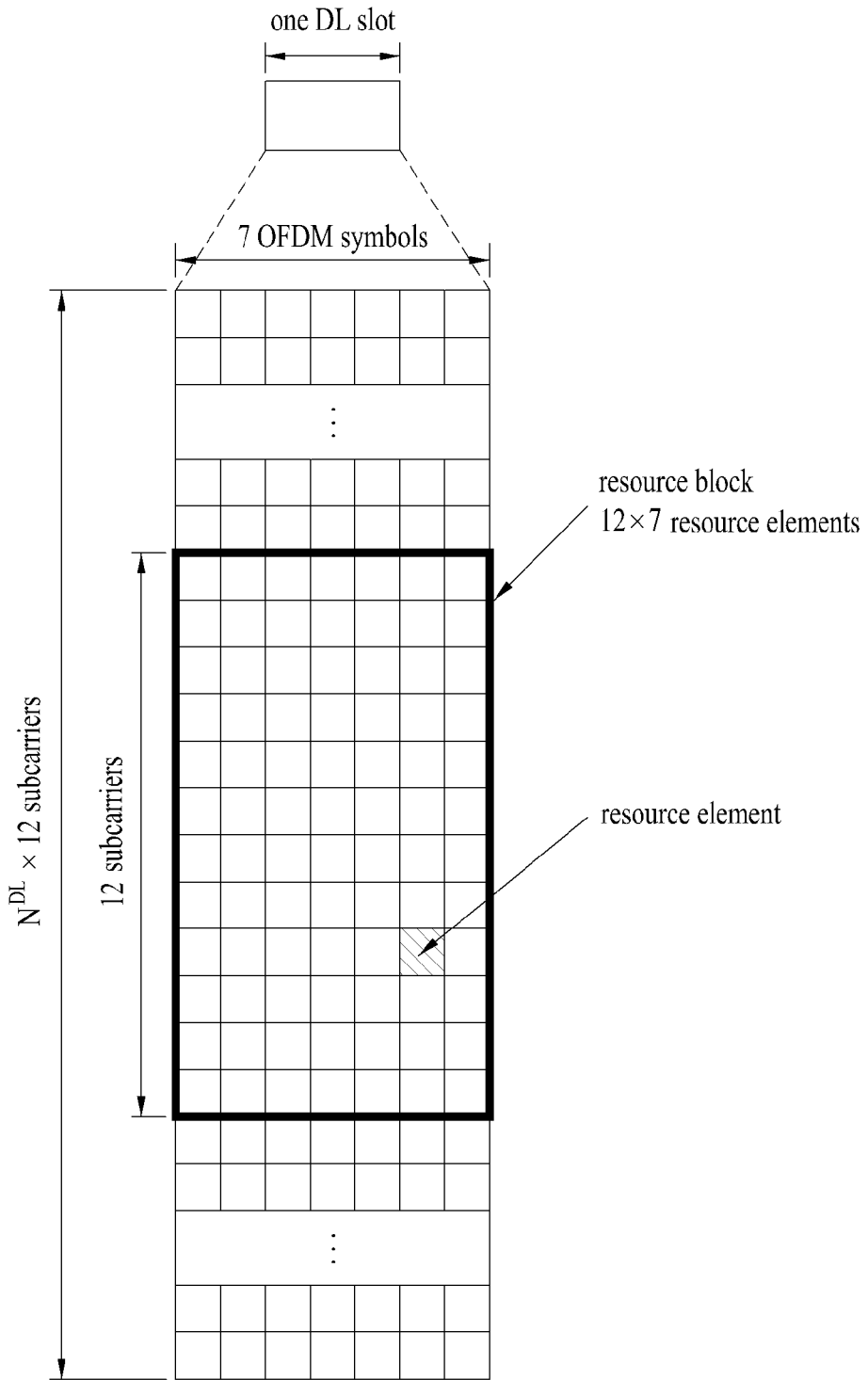
FIG. 3 is a diagram for one example of a resource grid in a downlink slot.

FIG. 3 is a diagram for one example of a resource grid in a downlink (DL) slot. In the drawing, one DL slot may include 7 OFDM symbols in time domain and one resource block (RB) may include 12 subcarriers in frequency domain, by which the present invention may be non-limited. For instance, in case of a normal CP (cyclic prefix), one slot includes 7 OFDM symbols. Yet, in case of an extended CP (extended-CP), one slot may include 6 OFDM symbols. Each element on a resource grid may be called a resource element (RE). One resource block includes 12×7 resource elements. $N^{DL}$ indicates the number of resource blocks included in a DL slot. And, the value of the $N^{DL}$ may depend on a DL transmission bandwidth. A structure of UL slot may be identical to that of the DL slot.

Figure 4:
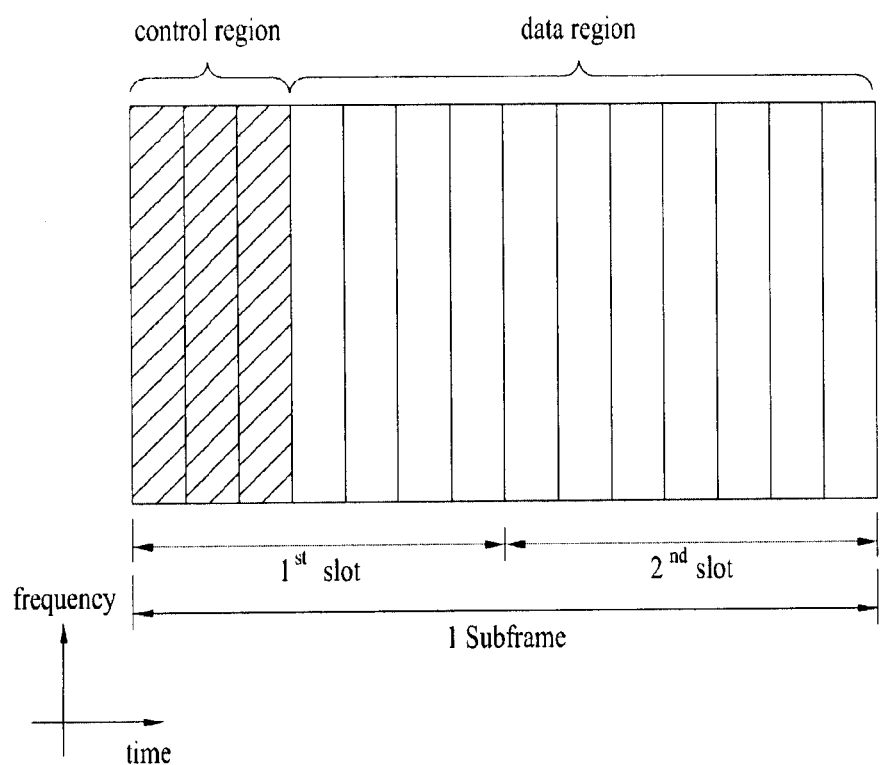
FIG. 4 is a diagram for a structure of a downlink subframe.

FIG. 4 is a diagram for a structure of a downlink (DL) subframe. Maximum 3 OFDM symbols situated in a head part of a first slot of one subframe correspond to a control region to which a control channel is allocated. The rest of OFDM symbols correspond to a data region to which PDSCH (physical downlink shared channel) is allocated. DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission. Control information carried on PDCCH may be called downlink control information (DCI). The DCI may include UL or DL scheduling information or a UL transmission power control command for a random UE (user equipment) group. The PDCCH may include transmission format and resource allocation information of DL-SCH (downlink shared channel), resource allocation information on UL-SCH (uplink shared channel), paging information on PCH (paging channel), system information on DL-SCH, resource allocation of such an upper layer control message as a random access response transmitted on PDSCH, transmission power control command set for individual UEs within a random UE group, transmission power control information, activation of VoIP (voice over IP) and the like. A plurality of PDCCHs can be transmitted within the control region. A user equipment may be able to monitor a plurality of the PDCCHs. The PDCCH is transmitted as an aggregation of at least one or more contiguous CCEs (control channel elements). The CCE is a logical allocation unit used to provide the PDCCH at a coding rate based on a radio channel status. The CCE may correspond to a plurality of REGs (resource element groups). A format of the PDCCH and the number of available PDCCH bits may be determined in accordance with correlation between the number of CCEs and a coding rate provided by the CCE. A base station determines a PDCCH format in accordance with a DCI which is to be transmitted to a user equipment and attaches a CRC (cyclic redundancy check) to control information. The CRC is masked with an identifier named RNTI (radio network temporary identifier) in accordance with an owner or usage of the PDCCH. For instance, if the PDCCH is provided for a specific user equipment, the CRC may be masked with an identifier (e.g., cell-RNTI (C-RNTI)) of the corresponding user equipment. In case that the PDCCH is provided for a paging message, the CRC may be masked with a paging indicator identifier (e.g., P-RNTI). If the PDCCH is provided for system information (particularly, for a system information block (SIC)), the CRC may be masked with a system information identifier and a system information RNTI (SI-RNTI). In order to indicate a random access response to a transmission of a random access preamble of a user equipment, the CRC may be masked with RA-RNTI (random access-RNTI).

Figure 5:
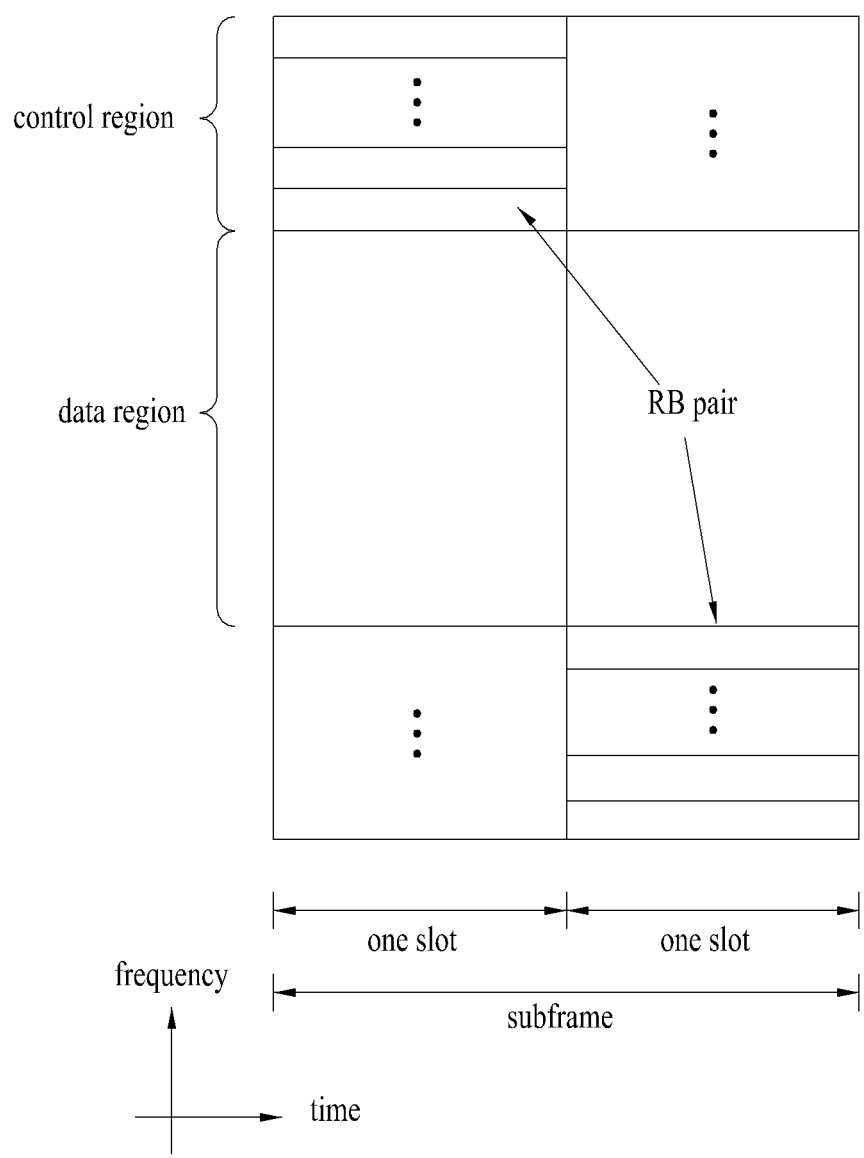
FIG. 5 is a diagram for a structure of an uplink subframe.

FIG. 5 is a diagram for a structure of an uplink (UL) subframe. A UL subframe may be divided into a control region and a data region in frequency domain. A physical UL control channel (PUCCH) including UL control information may be allocated to the control region. And, a physical UL shared channel (PUSCH) including user data may be allocated to the data region. In order to maintain single carrier property, one user equipment does not transmit PUCCH and PUSCH simultaneously. PUCCH for one user equipment may be allocated to a resource block pair (RB pair) in subframe. Resource blocks belonging to the resource block pair may occupy different subcarriers for 2 slots. Namely, a resource block pair allocated to PUCCH is frequency-hopped on a slot boundary.

Multi-Antenna (MIMO) System

Multi-antenna (MIMO) technology is the practical application of the technology of assembling pieces of data fragments received via several antennas to receive a message by avoiding a single antenna path. Since the MIMO technology increases a data transmission speed in a specific range or a system range for a specific data transmission rate, it is the next generation mobile communication technology widely applicable to a mobile communication user equipment, a relay node and the like. And, many ongoing attentions are paid to the MIMO technology as a next generation technology capable of overcoming the traffic limit of mobile communication reaching the limited situation due to data communication expansion and the like.

MIMO technology may be categorized into a spatial multiplexing scheme and a spatial diversity scheme in accordance with a presence or non-presence of the same data transmission. The spatial multiplexing scheme is a method of simultaneously transmitting different data via several transmitting/receiving antennas. In particular, a transmitting side transmits different data via the transmitting antennas, respectively, and a receiving side sorts the transmitted data through appropriate interference elimination and signal processing, whereby a transmission date can be raised as many as the number of the transmitting antennas. The spatial diversity scheme is a method of obtaining transmission diversity by transmitting the same data via multiple transmitting antennas and is a sort of a space time channel coding scheme. The spatial diversity scheme transmits the same data via multiple transmitting antennas, thereby maximizing transmission diversity gain (capacity gain). Yet, the spatial diversity scheme is not the method for improving a transmission rate but is a technique of raising reliability of transmission owing to diversity gain. If these two schemes are appropriately combined, advantages of the two schemes can be properly obtained. Moreover, the MIMO system may be categorized into an open loop type (or a channel independent type) and a closed loop type (or a channel dependent type) in accordance with a presence or non-presence of feedback of channel information from the receiving side to the transmitting side.

Figure 6:
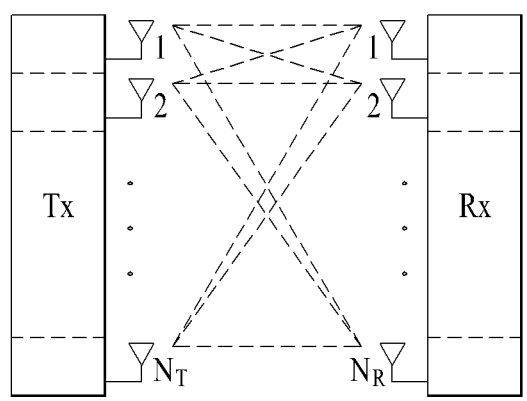
FIG. 6 is a diagram for a configuration of a general multi-antenna (MIMO) communication system.
Figure 6:
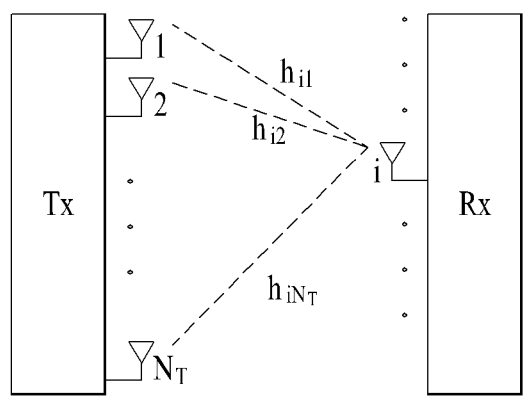

FIG. 6 is a diagram for a configuration of a general MIMO communication system. Referring to FIG. 6 (a), if the number of transmitting antennas and the number of receiving antennas are simultaneously incremented into $N_T$ and $N_R$, respectively, theoretical channel transmission capacity may increase in proportion to the number of antennas unlike the case that a transmitter or receiver uses a plurality of antennas. Hence, a transmission rate may be enhanced and frequency efficiency can be remarkably raised. The transmission rate according to the increase of the channel transmission capacity may be theoretically raised by an amount resulting from multiplying a maximum transmission rate $R_0$ of the case of using a single antenna by an increasing rate $R_i$ of Formula 1 in the following.

$$R_i = \min(N_T, N_R) \qquad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many efforts are ongoing to be made to various techniques for drive it into substantial data rate improvement. Some of theses techniques are already adopted as standards for various wireless communications such as 3G mobile communications, a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Referring to FIG. 6 (a), assume that $N_T$ transmitting antennas and $N_R$ receiving antennas exist in this system. First of all, a transmitted signal is explained. If there are $N_T$ transmitting antennas, the number of maximum transmittable informations is $N_T$. Hence, the transmission information may be represented as a vector shown in Formula 2.

$$s = [s_1, s_2, \ldots, s_{N_T}]^T \qquad \text{[Formula 2]}$$

Meanwhile, transmission power can be set different for each of transmission informations $s_1, s_2, \ldots, s_{N_T}$. If the respective transmission powers are set to $P_1, P_2, \ldots, P_{N_T}$, respectively, the transmission power adjusted transmission information may be represented as Formula 3.

$$\hat{s} = [\hat{s}_1, \hat{s}_2, \ldots, \hat{s}_{N_T}]^T = [Ps_1, Ps_2, \ldots, Ps_{N_T}]^T \qquad \text{[Formula 3]}$$

And, $\hat{s}$ may be represented as Formula 4 using a transmission power diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Formula 4]}$$

If a weight matrix W is applied to the transmission power adjusted transmission information vector $\hat{s}$, a case of configuring $N_T$ transmitted signals $x_1, x_2, \ldots, x_{N_T}$ actually transmitted can be taken into consideration as follows. In this case, the weight matrix W plays a role in properly distributing each transmission information to each antenna according to a transmission channel status and the like. The transmitted signals $x_1, x_2, \ldots, x_{N_T}$ may be represented as Formula 5 using a vector X. In Formula 5, $w_{ij}$ indicates a weight between an $i^{th}$ transmitting antenna and a $j^{th}$ information. And, W may be called a weight matrix or a precoding matrix.

$$x = \begin{bmatrix} x_1 \\ x_2 \\ \vdots \\ x_i \\ \vdots \\ x_{N_T} \end{bmatrix}$$ [Formula 5]

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

When $N_R$ receiving antennas exist, if received signals of the receiving antennas are set to $y_1, y_2, \ldots, y_{N_R}$, a received signal vector can be represented as Formula 6.

$$y = [y_1, y_2, \ldots, y_{N_R}]^T$$ [Formula 6]

Meanwhile, if a channel is modeled in MIMO communication system, the channel can be identified by an index of a transmitting antenna and an index of a receiving antenna. A channel between a transmitting antenna j and a receiving antenna i may be represented as $h_{ij}$. Regarding an index order of the $h_{ij}$, it should be noted that a receiving antenna index is followed by a transmitting antenna index in order of index.

These channels may be represented as a vector and matrix form in a manner of tying the channels together. One example of the vector expression is described as follows. FIG. 6 (b) is a diagram of a channel to a receiving antenna i from each of $N_T$ transmitting antennas.

Referring to FIG. 6 (b), the channels between the receiving antenna i and the $N_T$ transmitting antennas can be represented as follows.

$$h_i^T = [h_{i1}, h_{i2}, \ldots, h_{iN_T}]$$ [Formula 7]

Hence, all the channels arriving at $N_R$ receiving antennas from $N_T$ transmitting antennas through the matrix expression shown in Formula 7 may be expressed as Formula 8.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix}$$ [Formula 8]

In an actual channel, a transmitted signal passes through a channel matrix H and then has AWGN (additive white Gaussian noise) added thereto. If white noses $n_1, n_2, \ldots, n_{N_R}$ are added to $N_R$ receiving antennas, respectively, the white noises $n_1, n_2, \ldots, n_{N_R}$ can be represented as a vector shown in Formula 9.

$$n = [n_1, n_2, \ldots, n_{N_R}]^T$$ [Formula 9]

Hence, the received signal found by means of the above formulas may be represented as Formula 10.

$$y = \begin{bmatrix} y_1 \\ y_2 \\ \vdots \\ y_i \\ \vdots \\ y_{N_R} \end{bmatrix}$$ [Formula 10]

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

Meanwhile, the number of rows and the number of columns in a channel matrix H indicating a channel status are dependent on the number of transmitting antennas and the number of receiving antennas. The number of rows in the channel matrix H is equal to the number $N_R$ of the receiving antennas. The number of columns in the channel matrix H is equal to the number $N_T$ of the transmitting antennas. In particular, the channel matrix H may be expressed as $N_R \times N_T$ matrix. Generally, a rank of matrix is defined as a smaller one of the number of independent rows and the number of independent columns. Hence, it may be impossible for a rank of matrix to have a value greater than the number of rows or columns. A rank of a channel matrix H may be represented as Formula 11.

$$\text{rank}(H) \leq \min(N_T, N_R)$$ [Formula 11]

Meanwhile, regarding the MIMO transmission schemes mentioned in the foregoing description, a codebook based precoding scheme is described in detail as follows.

Figure 7:
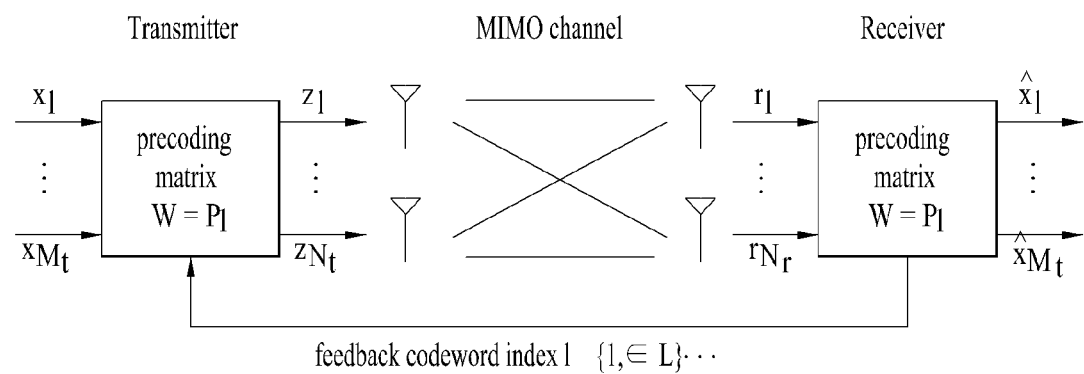
FIG. 7 is a diagram for describing a basic concept of codebook based precoding.

FIG. 7 is a diagram for describing a basic concept of codebook based precoding.

According to a codebook based precoding scheme, a transmitting end and a receiving end share codebook information including a prescribed number of precoding matrixes previously determined in accordance with a transmission rank, the number of antennas and the like. In particular, in case that feedback information is finite, a codebook based precoding scheme may be available. The receiving end measures a channel state via a received signal and may be then able to feed back information (i.e., indexes of the corresponding matrixes) on a finite number of preferred precoding matrixes to the transmitting end based on the above-mentioned codebook information. For instance, the receiving end may be able to select an optimal precoding matrix by measuring a received signal by ML (maximum likelihood) or MMSE (minimum mean square error). FIG. 7 shows that the receiving end transmits the precoding matrix information per codeword to the transmitting, by which the present invention may be non-limited.

Having received the feedback information from the receiving end, the transmitting end may be able to select a specific precoding matrix from the codebook based on the received information. Having selected the precoding matrix, the transmitting end performs precoding in a manner of multiplying layer signals, of which number amounts to a transmission rank, by the selected precoding matrix. The transmitting end may be then able to transmit the precoded transmission signal via a plurality of antennas. The number of rows in a precoding matrix is equal to the number of antennas, while the number of columns is equal to a rank value. Since the rank value is equal to the number of layers, the number of the columns is equal to the number of the layers. For instance, when the number of transmitting antennas and the number of layers are 4 and 2, respectively, a precoding matrix may consist of 4×2 matrix. Formula 12 in the following represents an operation of mapping information mapped to each layer to a corresponding antenna.

$$\begin{bmatrix} y_1 \\ y_2 \\ y_3 \\ y_4 \end{bmatrix} = \begin{bmatrix} p_{11} & p_{21} \\ p_{12} & p_{22} \\ p_{13} & p_{23} \\ p_{14} & p_{24} \end{bmatrix} \cdot \begin{bmatrix} x_1 \\ x_2 \end{bmatrix}$$ [Formula 12]

Referring to Formula 12, information mapped to layer includes $x_1$ and $x_2$ and each element $p_{ij}$ of 4×2 matrix is a weight used for precoding. $y_1, y_2, y_3$ and $y_4$ indicate informations mapped to antennas and may be transmitted via corresponding antennas by OFDM transmission schemes, respectively.

Having received the signal precoded and transmitted by the transmitting end, the receiving end may be able to reconstruct the received signal by performing inverse processing of the precoding performed by the transmitting end. Generally, since a precoding matrix meets such a unitary matrix (U) condition as '$U*U^H=I$', the above-mentioned inverse processing of the precoding may be performed in a manner of multiplying the received signal by Hermit matrix $P^H$ of the precoding matrix P used for the precoding performed by the transmitting end.

Since the precoding is requested to have good capacity for antenna configurations of various types, it may be necessary to consider capacity for various antenna configurations in codebook design. In the following description, an exemplary configuration of multiple antennas is explained.

Figure 8:
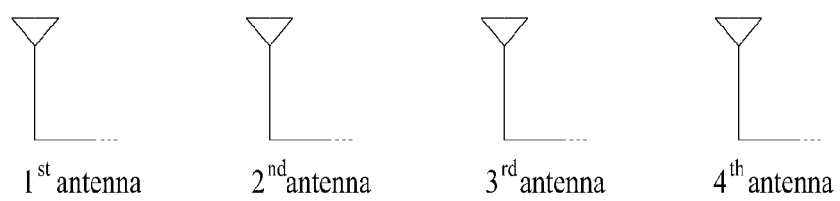
FIG. 8 is a diagram for describing array of antennas in MIMO system.
Figure 8:
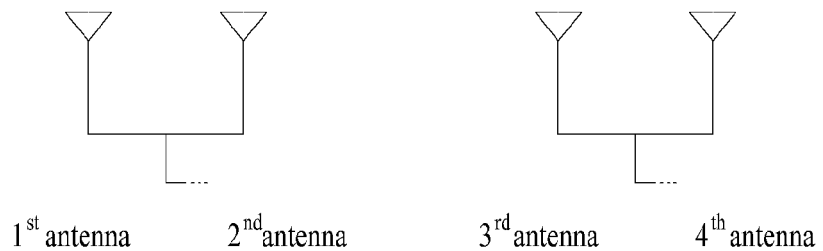
Figure 8:
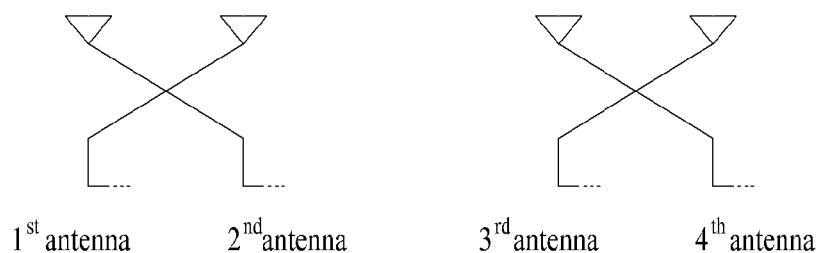

FIG. 8 is a diagram for describing array of antennas in MIMO system. For instance, in case that 4 transmitting antennas are used in MIMO technology, each of the 4 transmitting antennas should configure an independent channel environment for an optimal state. To this end, the respective antennas are arranged in a manner of being physically spaced apart from each other in general.

FIG. 8 (a) shows a case that 4 antennas configure channels independent from each other without being grouped. In FIG. 8 (a), the illustrated antennas include $1^{st}$ to $4^{th}$ antennas, respectively and may be generally called ULA (uniform linear array). And, this antenna configuration may be called a low correlated antenna configuration. Yet, in order to configure channels independent from each other in a manner that 4 antennas are arranged by being spaced apart from each other, a space of the transmitting/receiving side may be insufficient. Specifically, it may be difficult to apply this configuration to a mobile station.

Hence, referring to FIG. 8 (b), 4 antennas are grouped into two groups each of which includes 2 antennas. A channel is related between the two antennas of each of the groups. And, the antenna of one group has a channel independent from that of the antenna of the other group. This antenna configuration may be called a high correlated antenna configuration.

Moreover, referring to FIG. 8 (c), an antenna array in a cross-polarized antenna system may be available. Referring to FIG. 8 (c), the $1^{st}$ antenna and the $3^{rd}$ antenna are polarized in the same direction, while the $2^{nd}$ antenna and the $4^{th}$ antenna are polarized in the same direction.

In the legacy 3GPP LTE system (e.g., system according to 3GPP LTE Release-8 Standard, system according to 3GPP LTE Release-9 Standard, etc.), since maximum 4 transmitting antennas are supported in DL, a codebook for 4 transmitting antennas is designed. In the 3GPP LTE-A system evolved from the legacy 3GPP LTE system, maximum 8 transmitting antennas are supported in DL. Hence, it may be necessary to design a precoding codebook that provides good capacity for a DL transmission via maximum 8 transmitting antennas.

Moreover, when a codebook is designed, generally required are constant modulus property, finite alphabet, restriction on a codebook size, nested property, and providing good capacity for various antenna configurations.

The constant modulus property means a property that an amplitude of each channel component of a precoding matrix configuring a codebook is constant. According to this property, no matter what kind of a precoding matrix is used, power levels transmitted from all antennas may be maintained equal to each other. Hence, it may be able to raise efficiency in using a power amplifier.

The finite alphabet means to configure precoding matrixes using QPSK (quadrature phase shift keying) alphabet (i.e., ±1, ±j) only except a scaling factor in case of 2 transmitting antennas for example. Hence, when multiplication is performed on a precoding matrix by a precoder, it may be able to alleviate the complexity of calculation.

The codebook size may be restricted from exceeding a prescribed size. Since a size of a codebook increases, precoding matrixes for various cases can be included in the codebook, whereby a channel status can be more accurately reflected. Yet, the number of bits of a precoding matrix indicator (PMI) correspondingly increases to cause signaling overhead.

The nested property means that a portion of a high rank precoding matrix is configured with a low rank precoding matrix. Thus, if the corresponding precoding matrix is configured, although a base station determines to perform a DL transmission of a transmission rank lower than a channel rank indicated by a rank indicator (RI) reported from a user equipment, it may be able to secure proper capacity. Moreover, according to this property, complexity of CQI (channel quality information) calculation can be reduced. This is because calculation for a precoding matrix selection may be shared in part when an action of selecting a precoding matrix from precoding matrixes designed for different ranks is performed.

Providing good capacity for various antenna configurations may mean that providing capacity over a predetermined level is required for various cases including a low correlated antenna configuration, a high correlated antenna configuration, a cross-polarized antenna configuration and the like.

The requirements for the codebook design mentioned in the above description may apply to the case of 4 transmitting antennas in the legacy 3GPP LTE system. Yet, it may be preferable that a codebook for 8 transmitting antennas is designed to meet the above codebook design requirements as far as possible.

Figure 9:
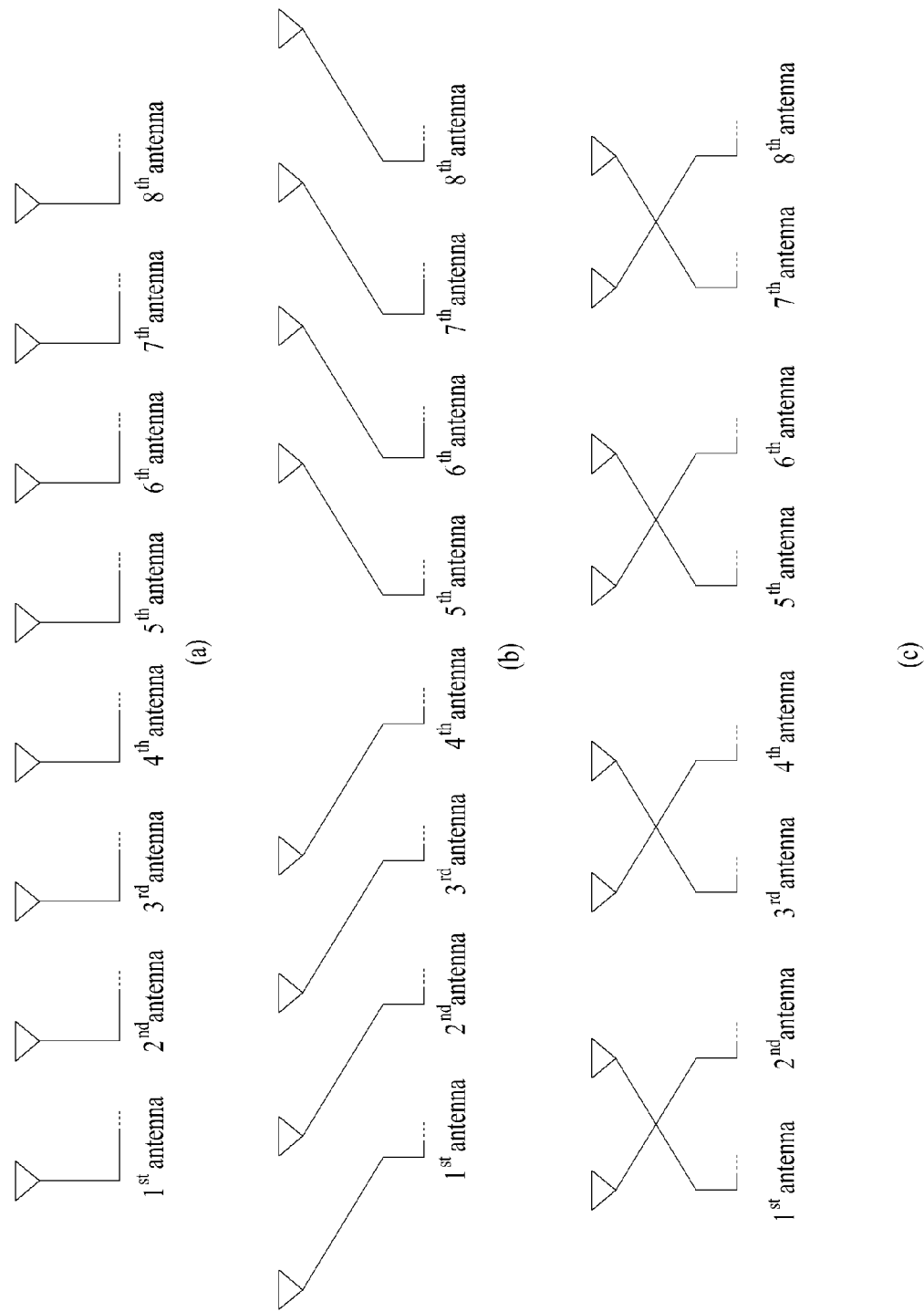
FIG. 9 is a diagram for describing exemplary configurations of 8 DL antennas.

FIG. 9 is a diagram for describing exemplary configurations of 8 DL antennas.

FIG. 9 (a) shows a case that 8 antennas configure independent channels without being grouped, in which $1^{st}$ $8^{th}$ antennas are configured by ULA. Referring to FIG. 9 (b), $1^{st}$ to $4^{th}$ antennas are polarized in one direction and $5^{th}$ to $8^{th}$ antennas are polarized in another direction. In this case, a relation of linearly increasing phase exists between the $1^{st}$ to $4^{th}$ antennas, while a relation of linearly increasing phase exists between the 5$^{th}$ to 8$^{th}$ antennas. Referring to FIG. 9 (c), 1$^{st}$, 3$^{rd}$, 5$^{th}$ and 7$^{th}$ antennas are polarized in a same direction and 2$^{nd}$, 4$^{th}$, 6$^{th}$ and 8$^{th}$ antennas are polarized in a same direction. So to speak, the 1$^{st}$ and 2$^{nd}$ antennas form a group, the 3$^{rd}$ and 4$^{th}$ antennas form another group, the 5$^{th}$ and 6$^{th}$ antennas form another group, and the 7$^{th}$ and 8$^{th}$ antennas form a further group. In each of the groups, the two antennas are polarized in different directions, respectively.

Regarding the codebook design in association with the antenna configuration in detail, when a cell having 8 transmitting antennas is arranged, 3 kinds of antenna configurations may be applicable. First of all, in case of a low correlated antenna configuration, a codebook size needs to be large to obtain a sufficient precoding gain from the 8 transmitting antennas. In case of a high correlated antenna configuration, it may be enough for a codebook size to be configured with 4 bits to obtain a precoding gain. Hence, it may be able to consider that a 4-bit codebook for a high correlated antenna configuration is included in a codebook for 8-transmitting antennas configuration.

Meanwhile, it may be necessary to consider a codebook for a cross-polarized antenna configuration. Regarding the codebook for the cross-polarized antenna configuration, a block diagonal matrix or a permutated type (i.e., a position modified type) of the block diagonal matrix may be able to provide better capacity. Considering that it is difficult to maintain the constant modulus property or the nested property, a block diagonal matrix or a permutated type of the block diagonal matrix is preferably usable. Therefore, the present invention proposes a precoding codebook for 8 transmitting antennas including precoding matrixes appropriate for a case of a cross-polarized antenna configuration as well as a high correlated antenna configuration.

In 3GPP LTE-A system supportive of 8-transmitting antennas configuration, a new codebook design scheme using a block diagonal matrix according to the present invention is described.

Regarding the 8-transmitting antenna codebook design proposed by the present invention, 4 base matrixes $W_1$, $W_2$, $W_3$ and $W_4$ including 2 block diagonal matrixes may be defined as Formulas 13 to 16 in the following.

$$W_1 = DFT_{8 \times 8} \qquad \text{[Formula 13]}$$

$$W_2 = P^T \begin{bmatrix} D_1 & 0 \\ 0 & D_1 \end{bmatrix} P, \qquad \text{[Formula 14]}$$
where $D_1 = DFT_{4 \times 4}$ $$W_3 = P^T \begin{bmatrix} D_2 & 0 \\ 0 & D_2 \end{bmatrix} P, \qquad \text{[Formula 15]}$$
where $D_2 = \text{diag}[1, e^{\pi j/4}, e^{\pi j/2}, e^{3\pi j/4}] DFT_{4 \times 4}$ $$W_4 = P^T W_1 \qquad \text{[Formula 16]}$$

In Formulas 13 to 16, P may be given as Formula 17.

$$P = [e_1 e_5 e_2 e_6 e_3 e_7 e_4 e_8] \qquad \text{[Formula 17]}$$

In Formula 17, $e_k$ means a unit vector having a non-zero value for a k$^{th}$ element. The base matrix $W_4$ may be configured as a form in which a vector sequence of the base matrix $W_1$ is changed by the permutation matrix shown in Formula 17. In particular, assuming that indexes of vectors of an original matrix are {1, 2, 3, 4, 5, 6, 7, 8} in order, the vector sequence of the permutated matrix is changed into {1, 5, 2, 6, 3, 7, 4, 8}. By applying this permutation, capacity of a precoding codebook for various antenna configurations can be maintained at high level.

Moreover, in Formulas 13 to 16, DFT matrix may include a square matrix and may be configured in N×N size (where N is a natural number). The DFT matrix may be configured as a matrix shown in Table 1.

TABLE 1

$$DFT_{N \times N} = \frac{1}{\sqrt{N}} \begin{bmatrix} 1 & 1 & \cdots & 1 \\ 1 & e^{j2\pi \frac{1 \cdot 1}{N}} & \cdots & e^{j2\pi \frac{1 \cdot (k-1)}{N}} \\ \vdots & \vdots & \ddots & \vdots \\ 1 & e^{j2\pi \frac{(n-1) \cdot 1}{N}} & \cdots & e^{j2\pi \frac{(n-1) \cdot (k-1)}{N}} \end{bmatrix}$$

Moreover, $DFT_{4 \times 4}$ matrix and $DFT_{8 \times 8}$ matrix may be configured as Table 2 and Table 3, respectively.

TABLE 2

$$DFT_{4 \times 4} = \frac{1}{\sqrt{4}} \begin{bmatrix} 1 & 1 & 1 & 1 \\ 1 & j & -1 & -j \\ 1 & -1 & 1 & -1 \\ 1 & -j & -1 & j \end{bmatrix}$$

TABLE 3

$$DFT_{8 \times 8} = \frac{1}{\sqrt{8}} \begin{bmatrix} w^0 & w^0 & w^0 & w^0 & w^0 & w^0 & w^0 & w^0 \\ w^0 & w^1 & w^2 & w^3 & w^4 & w^5 & w^6 & w^7 \\ w^0 & w^2 & w^4 & w^6 & w^8 & w^{10} & w^{12} & w^{14} \\ w^0 & w^3 & w^6 & w^9 & w^{12} & w^{15} & w^{18} & w^{21} \\ w^0 & w^4 & w^8 & w^{12} & w^{16} & w^{20} & w^{24} & w^{28} \\ w^0 & w^5 & w^{10} & w^{15} & w^{20} & w^{25} & w^{30} & w^{35} \\ w^0 & w^6 & w^{12} & w^{18} & w^{24} & w^{30} & w^{36} & w^{42} \\ w^0 & w^7 & w^{14} & w^{21} & w^{28} & w^{35} & w^{42} & w^{49} \end{bmatrix}$$

where, $w = e^{-\frac{2\pi i}{8}}$

In Formula 14, $D_1$ consists of $DFT_{4 \times 4}$ matrix and a base matrix $W_2$ consists of a block diagonal matrix. Thus, in case that a base matrix of a precoding codebook consists of a block diagonal type, for the cross-polarized antenna configuration shown in FIG. 9 (b) for example, the beam formed in the 1$^{st}$ to 4$^{th}$ antennas may have the same form of the beam formed in the 5$^{th}$ to 8$^{th}$ antennas. Since these beams are formed for the cross-polarized antennas polarized in different directions, respectively, they may not overlap with each other.

In Formula 15, D2 is configured in a manner that a phase diagonal matrix is applied to $DFT_{4 \times 4}$ matrix. And, a base matrix $W_3$ is configured in a block diagonal form. By applying diag[1, $e^{\pi j/4}$, $e^{\pi j/2}$ $e^{3\pi j/4}$] to the $DFT_{4 \times 4}$ matrix, the beam formed by the $DFT_{4 \times 4}$ matrix can be phase shifted. In particular, the base matrix $W_3$ of Formula 15 has the feature similar to that of the base matrix $W_2$ of Formula 14 but the direction of the beam formed by the precoding matrix is shifted only. Hence, a space between the beams formed by the base matrix $W_2$ can be filled up with the beam formed by the base matrix $W_3$.

Based on the definition of the base matrixes, the precoding codebook for ranks 1 to 4 in the transmission via the 8 transmitting antennas according to the present invention may be configured as Table 4.

TABLE 4

| Codebook Index | Rank 1 | Rank 2 | Rank 3 | Rank 4 |
|---|---|---|---|---|
| 1 | [$W_1(1)$] | [$W_1(1)\ W_1(2)$] | [$W_1(1)\ W_1(2)\ W_1(3)$] | [$W_1(1)\ W_1(2)\ W_1(3)\ W_1(4)$] |
| 2 | [$W_1(2)$] | [$W_1(2)\ W_1(3)$] | [$W_1(2)\ W_1(3)\ W_1(4)$] | [$W_1(2)\ W_1(3)\ W_1(4)\ W_1(5)$] |
| 3 | [$W_1(3)$] | [$W_1(3)\ W_1(4)$] | [$W_1(3)\ W_1(4)\ W_1(5)$] | [$W_1(3)\ W_1(4)\ W_1(5)\ W_1(6)$] |
| 4 | [$W_1(4)$] | [$W_1(4)\ W_1(5)$] | [$W_1(4)\ W_1(5)\ W_1(6)$] | [$W_1(4)\ W_1(5)\ W_1(6)\ W_1(7)$] |
| 5 | [$W_1(5)$] | [$W_1(5)\ W_1(6)$] | [$W_1(5)\ W_1(6)\ W_1(7)$] | [$W_1(5)\ W_1(6)\ W_1(7)\ W_1(8)$] |
| 6 | [$W_1(6)$] | [$W_1(6)\ W_1(7)$] | [$W_1(6)\ W_1(7)\ W_1(8)$] | [$W_1(6)\ W_1(7)\ W_1(8)\ W_1(1)$] |
| 7 | [$W_1(7)$] | [$W_1(7)\ W_1(8)$] | [$W_1(7)\ W_1(8)\ W_1(1)$] | [$W_1(7)\ W_1(8)\ W_1(1)\ W_1(2)$] |
| 8 | [$W_1(8)$] | [$W_1(8)\ W_1(1)$] | [$W_1(8)\ W_1(1)\ W_1(2)$] | [$W_1(8)\ W_1(1)\ W_1(2)\ W_1(3)$] |
| 9 | [$W_4(1)$] | [$W_2(1)\ W_2(2)$] | [$W_2(1)\ W_2(2)\ W_4(2)$] | [$W_2(1)\ W_2(2)\ W_2(3)\ W_2(4)$] |
| 10 | [$W_4(2)$] | [$W_2(3)\ W_2(4)$] | [$W_2(3)\ W_2(4)\ W_4(4)$] | [$W_2(3)\ W_2(4)\ W_2(5)\ W_2(6)$] |
| 11 | [$W_4(3)$] | [$W_2(5)\ W_2(6)$] | [$W_2(5)\ W_2(6)\ W_4(6)$] | [$W_2(5)\ W_2(6)\ W_2(7)\ W_2(8)$] |
| 12 | [$W_4(4)$] | [$W_2(7)\ W_2(8)$] | [$W_2(7)\ W_2(8)\ W_4(8)$] | [$W_2(7)\ W_2(8)\ W_2(1)\ W_2(2)$] |
| 13 | [$W_4(5)$] | [$W_3(1)\ W_5(2)$] | [$W_3(1)\ W_3(2)\ W_4(1)$] | [$W_3(1)\ W_3(2)\ W_3(3)\ W_3(4)$] |
| 14 | [$W_4(6)$] | [$W_3(3)\ W_3(4)$] | [$W_3(3)\ W_3(4)\ W_4(3)$] | [$W_3(3)\ W_3(4)\ W_3(5)\ W_3(6)$] |
| 15 | [$W_4(7)$] | [$W_3(5)\ W_3(6)$] | [$W_3(5)\ W_3(6)\ W_4(5)$] | [$W_3(5)\ W_3(6)\ W_3(7)\ W_3(8)$] |
| 16 | [$W_4(8)$] | [$W_3(7)\ W_3(8)$] | [$W_3(7)\ W_3(8)\ W_4(7)$] | [$W_3(7)\ W_3(8)\ W_3(1)\ W_3(2)$] |

In Table 4, Wi(k) indicates $k^{th}$ column vector of a base matrix Wi.

The 8-transmitting antennas codebook configured as Table 4 may be shared between a DL transmission entity (e.g., a base station) and a DL reception entity (e.g., a user equipment). Moreover, the precoding codebook shown in Table 4 may configure a portion of a precoding codebook (e.g., a codebook including precoding matrixes of ranks 1 to 8) for rank 4 or higher. In particular, in the codebook for rank 4 or higher, the codebook shown in Table 4 may be usable as the codebooks of ranks 1 to 4.

For the rank 2 in the precoding codebook shown in Table 4, precoding matrixes of codebook indexes 1 to 8 have linear configurations, while the precoding matrixes of codebook indexes 9 to 16 have block diagonal configurations.

For the codebook indexes 1 to 8 in the rank 1 codebooks of the precoding codebook shown in Table 4, the precoding matrixes are configured with column vectors of the matrix $W_1$. For the codebook indexes 9 to 16 in the rank 1 codebooks of the precoding codebook shown in Table 4, the precoding matrixes are configured with column vectors of the matrix $W_4$. And, the matrix $W_1$ and the matrix $W_4$ have the permutation relation mentioned in the foregoing description.

In the precoding codebook shown in Table 4, a portion of a precoding matrix of a high rank at a random codebook index is configured with a precoding matrix of a low rank to meet the nested property. In particular, at a random codebook index, a portion of a rank 2 codebook is configured with a rank 1 codebook, a portion of a rank 3 codebook is configured with a rank 1 or 2 codebook, and a portion of a rank 4 codebook is configured with a rank 1, 2 or 3 codebook.

In the following description, capacity of a precoding codebook according to the present invention is explained using a simulation result of comparing the precoding codebook of the present invention to a different codebook. The codebook of the comparison target is the codebook proposed by R1-094583 document ("8Tx Codebook Design for Channel Feedback in support of DL SU-MIMO in LTE-A", Samsung, 3GPP TSG RAN WG1 Meeting #59, Jeju, Korea, Nov. 9-Nov. 13, 2009). In the following description, the codebook proposed by the present invention according to Table 4 shall be represented as codebook-A and the codebook proposed by R1-094583 document as a comparison target shall be represented as codebook-B.

Simulation parameters are given as Table 5 and simulation results are shown in FIGS. 10 to 19.

TABLE 5

| | |
|---|---|
| System Bandwidth | 7.68 MHz |
| Carrier frequency | 2 GHz |
| Number of Tx antennas | 8 |
| Number of Rx antennas | 2 |
| Antenna spacing | 0.5λ for both ULA and XPOL antenna configurations |
| XPOL antenna indexing | 1 2 3 4 5 6 7 8 X X X X |
| Channel model | SCME-C, Urban Macro High Spread |
| Mobile speed | 3 km/h |
| DL Channel estimation | Ideal |
| 8Tx Codebooks | codebook-A (present invention) codebook-B (R1-094583) |

FIGS. 10 to 19 show results of comparison between the codebook-A of the present invention and the comparison target, i.e., the codebook-B or a codebook resulting from performing row permutation on the codebook-B. The row-permutated codebook-B means a permutated type resulting from permutating the codebook-B using a permutation matrix $P^T$ and is set to verify capacity of the codebook-B irrespective of XPOL antenna indexing shown in Table 5.

Figure 10:
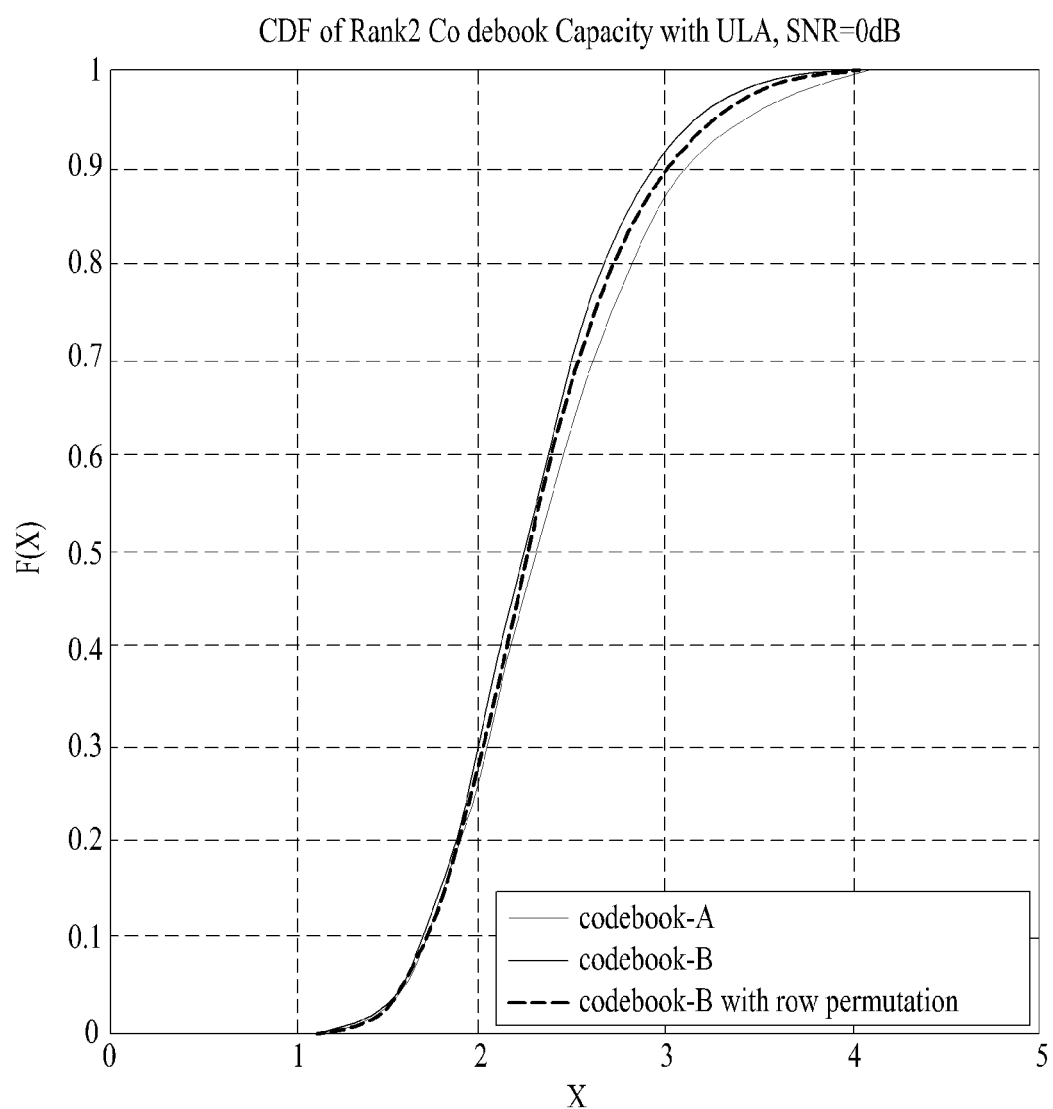
FIGS. 10 to 19 are graphs of simulation results for capacity of a codebook according to one embodiment of the present invention.
Figure 11:
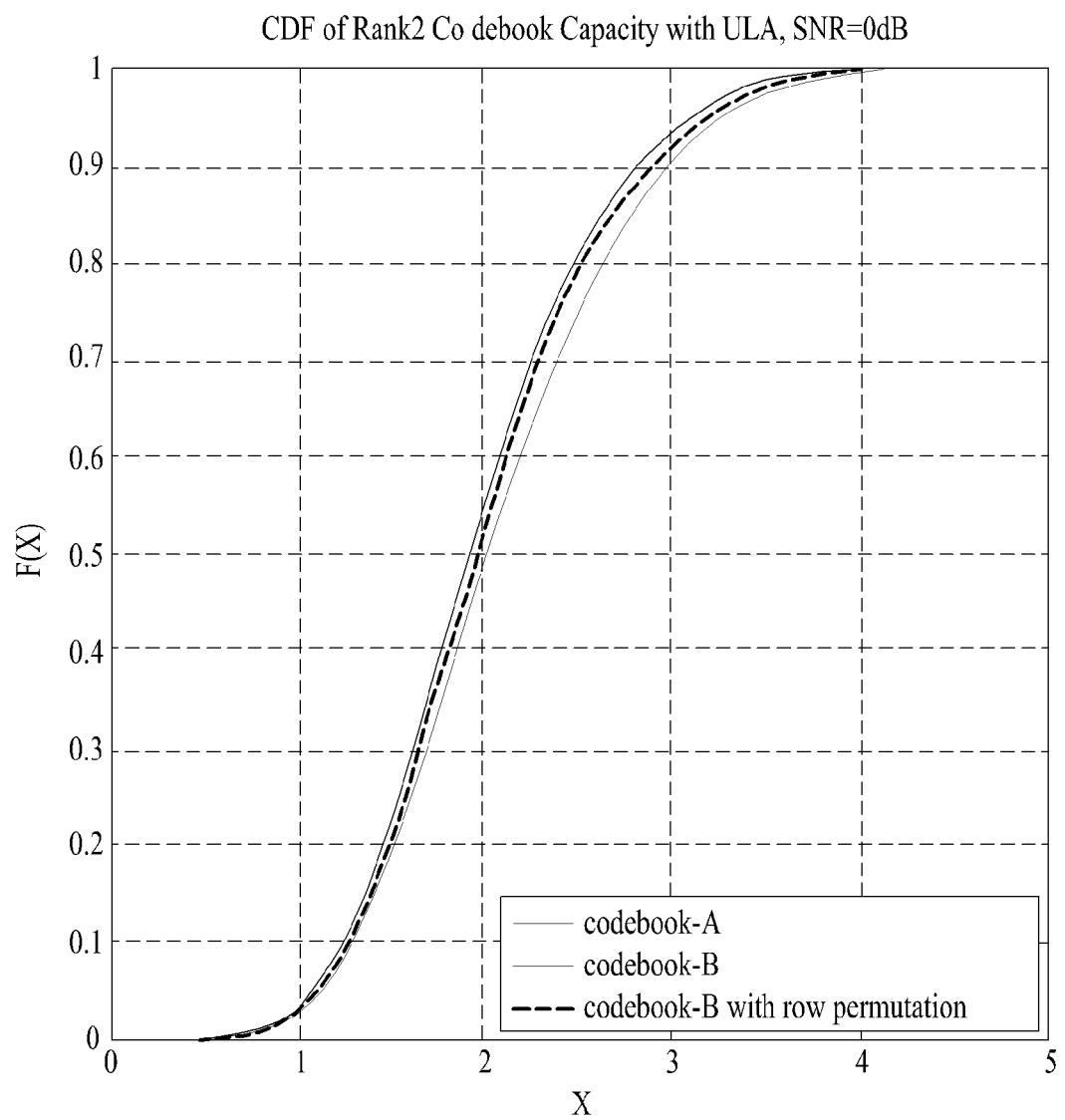
Figure 12:
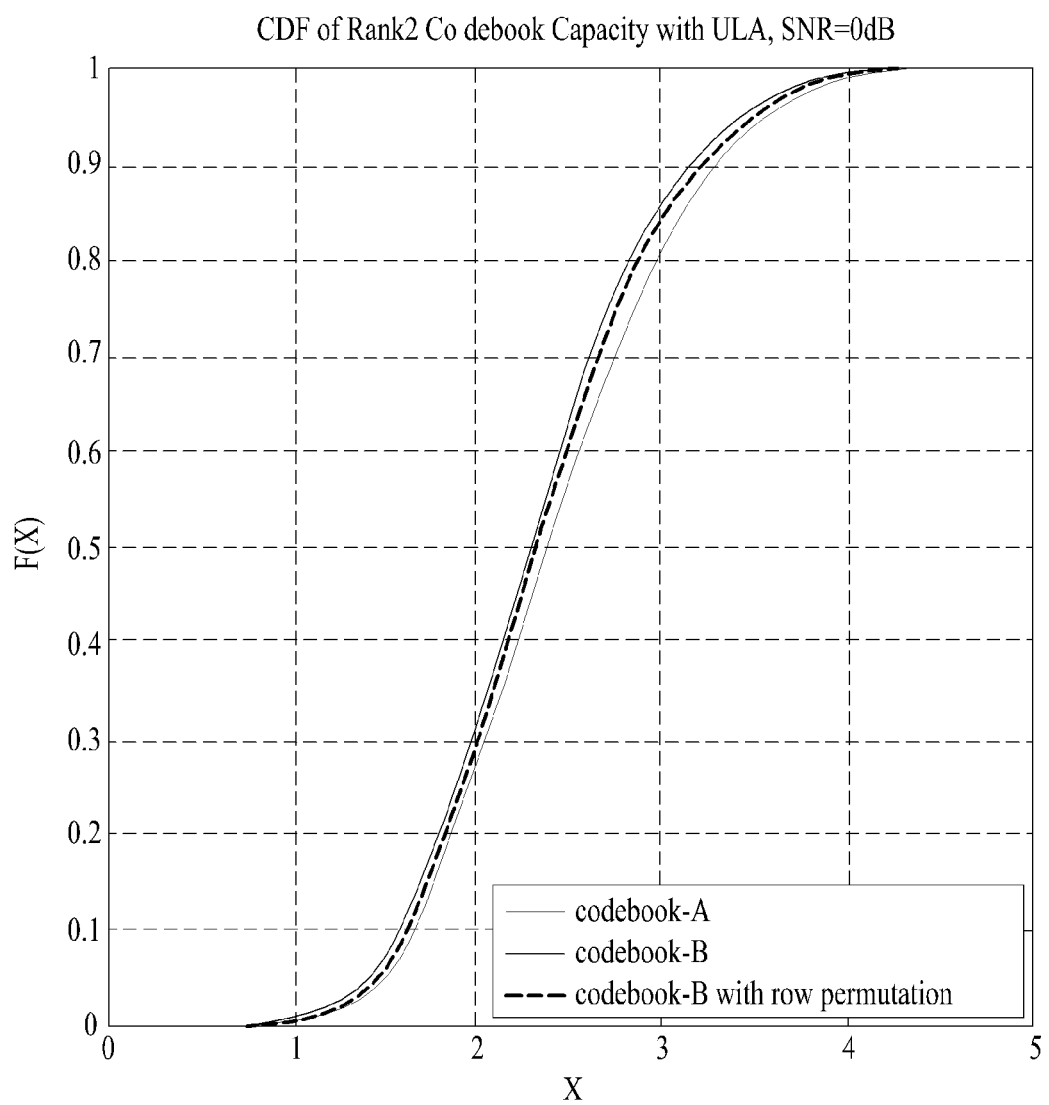
Figure 13:
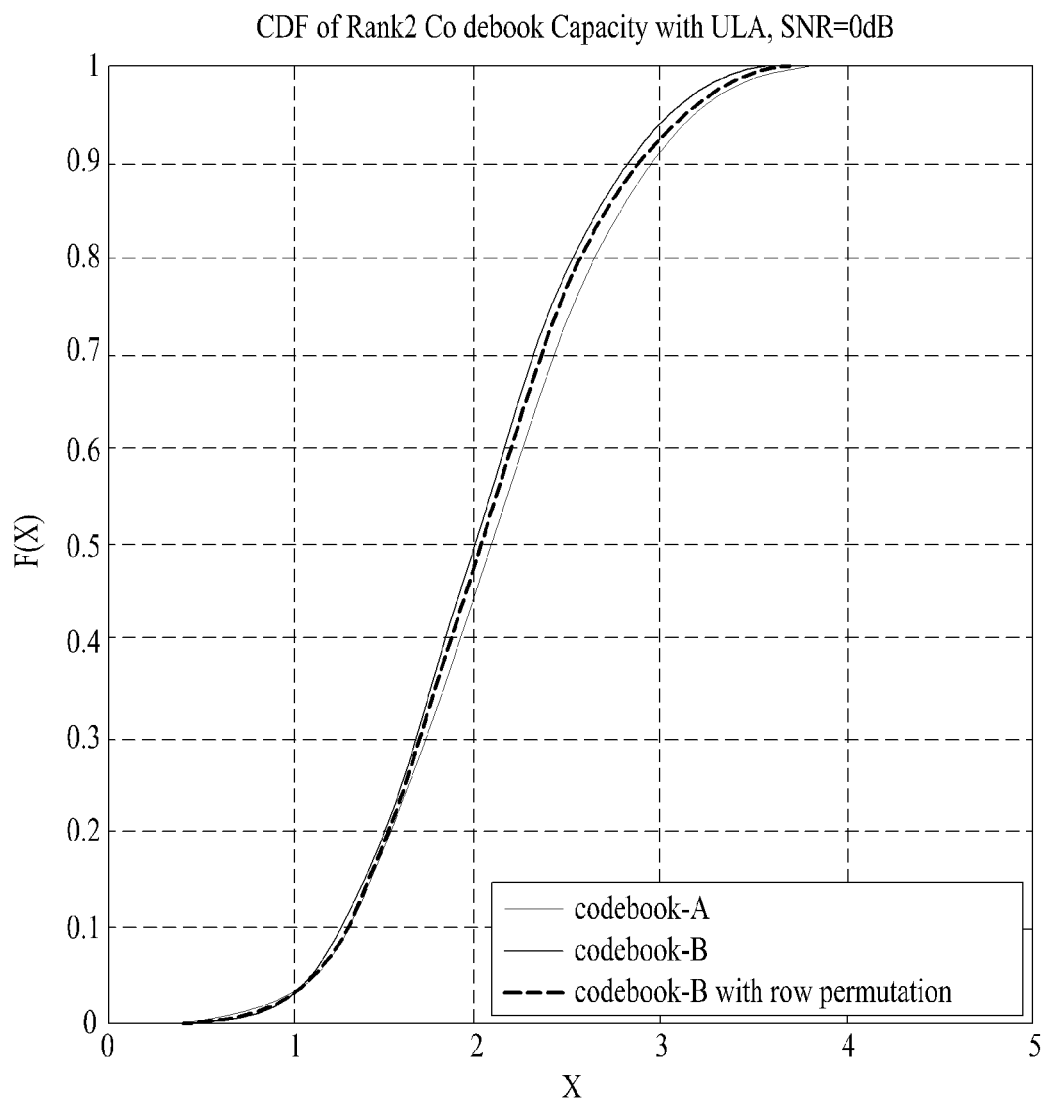

FIGS. 10 to 13 are diagrams of cumulative distribution function (CDF) of capacity of a rank 2 codebook capacity in consideration of ULA antenna configuration. In particular, FIG. 10 shows a result on the assumption that SNR is set to 0 dB, FIG. 11 shows a result on the assumption that SNR is set to 2 dB, FIG. 12 shows a result on the assumption that SNR is set to 4 dB, and FIG. 13 shows a result on the assumption that SNR is set to 6 dB.

Figure 14:
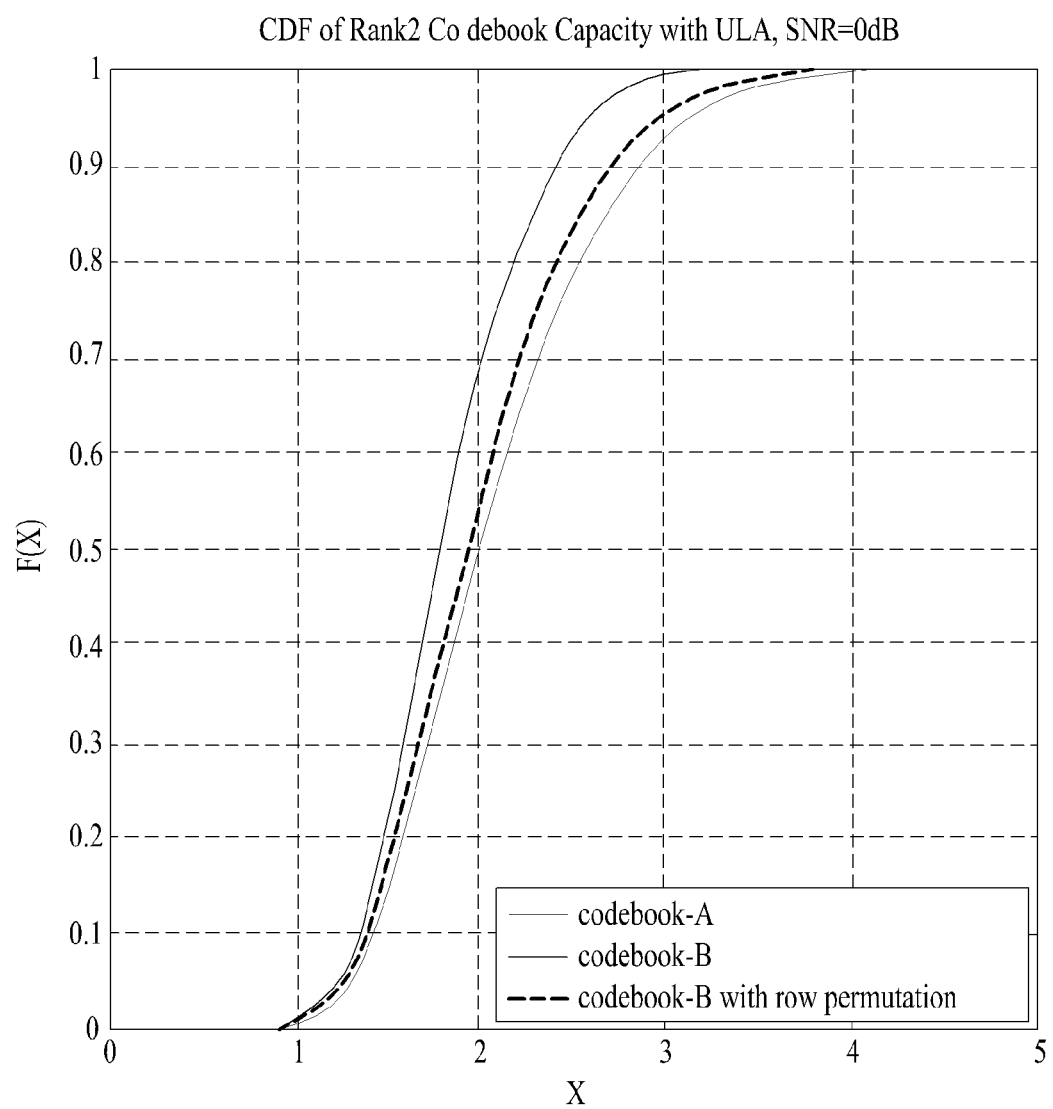
Figure 15:
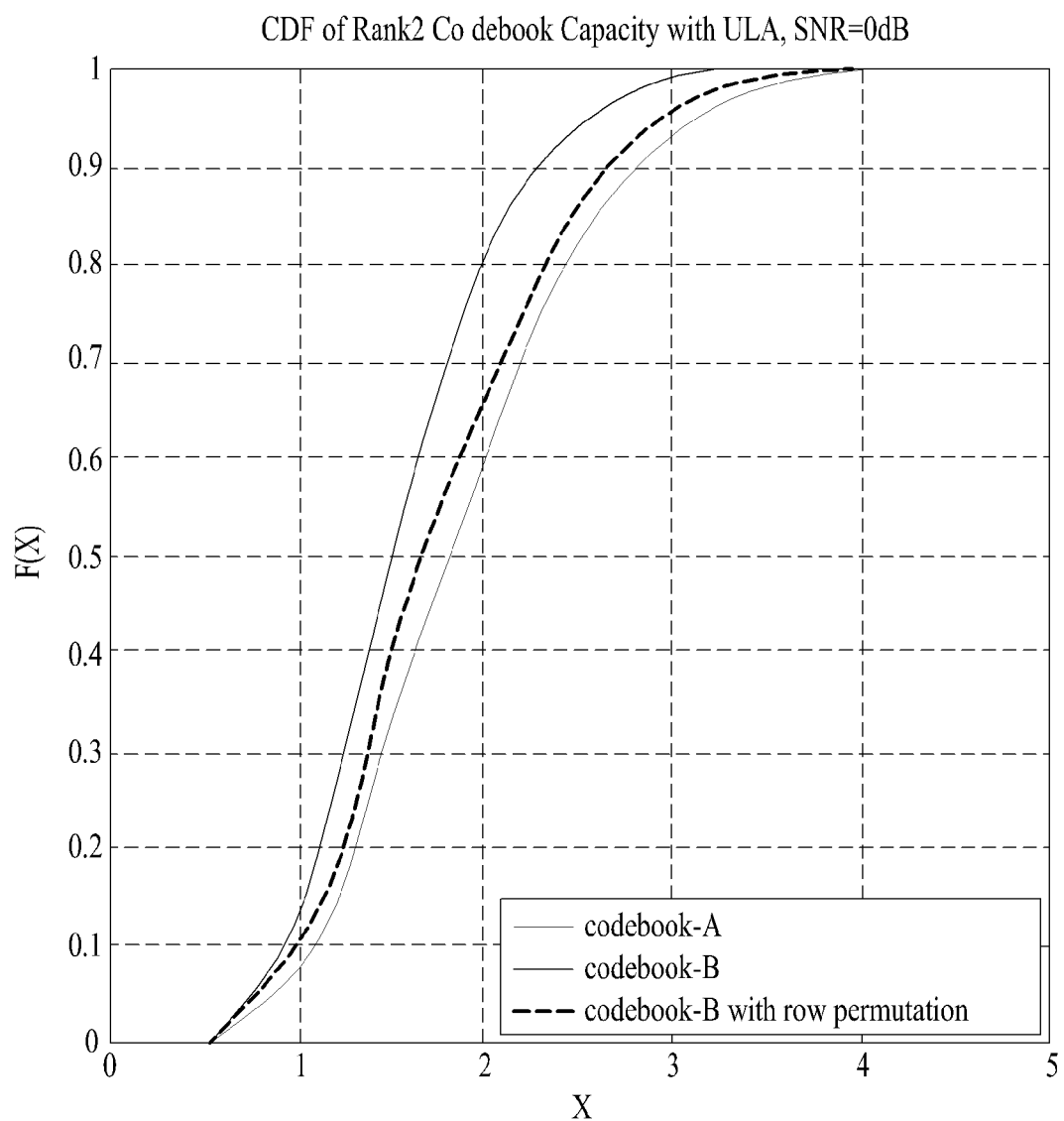
Figure 16:
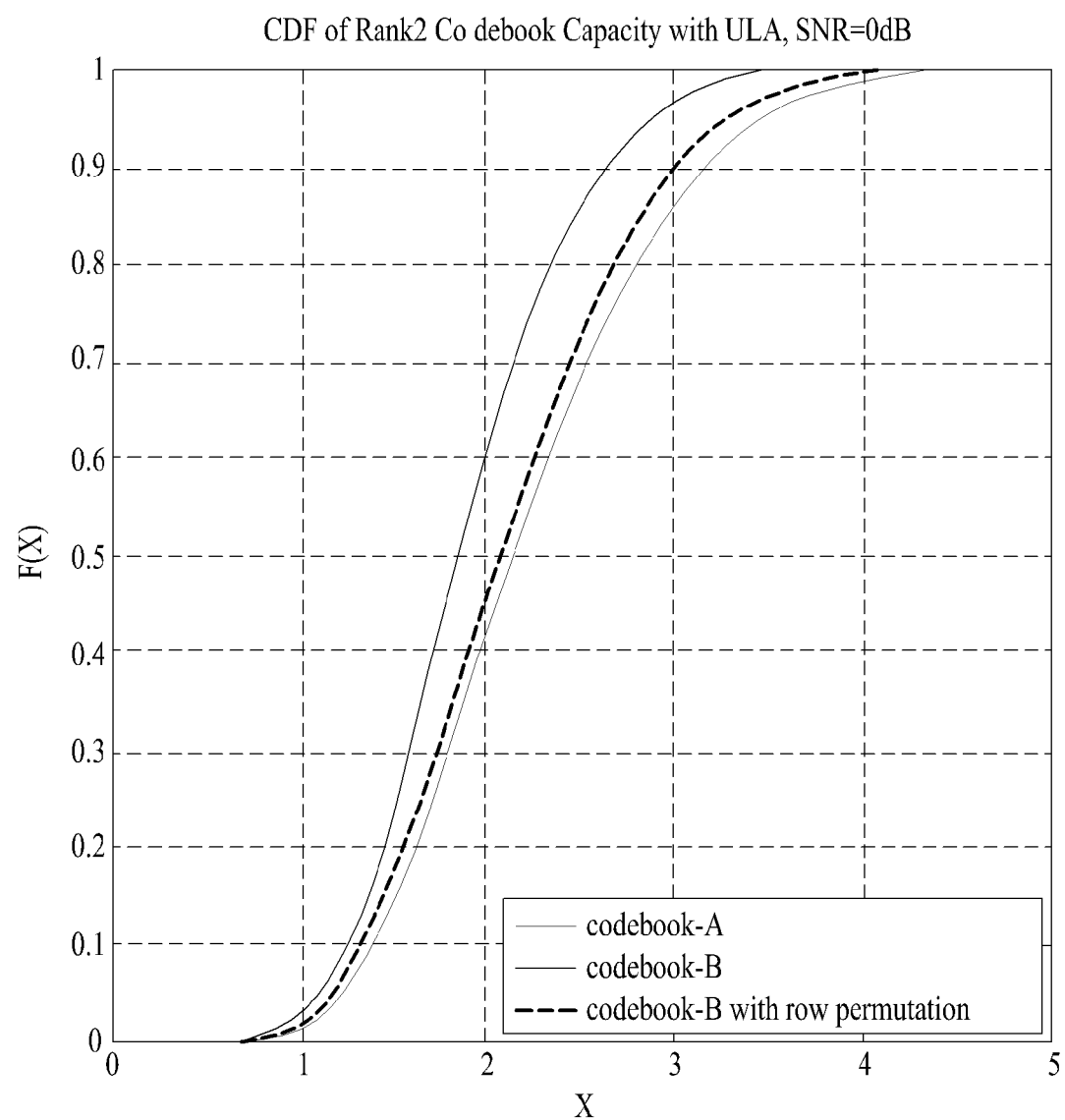
Figure 17:
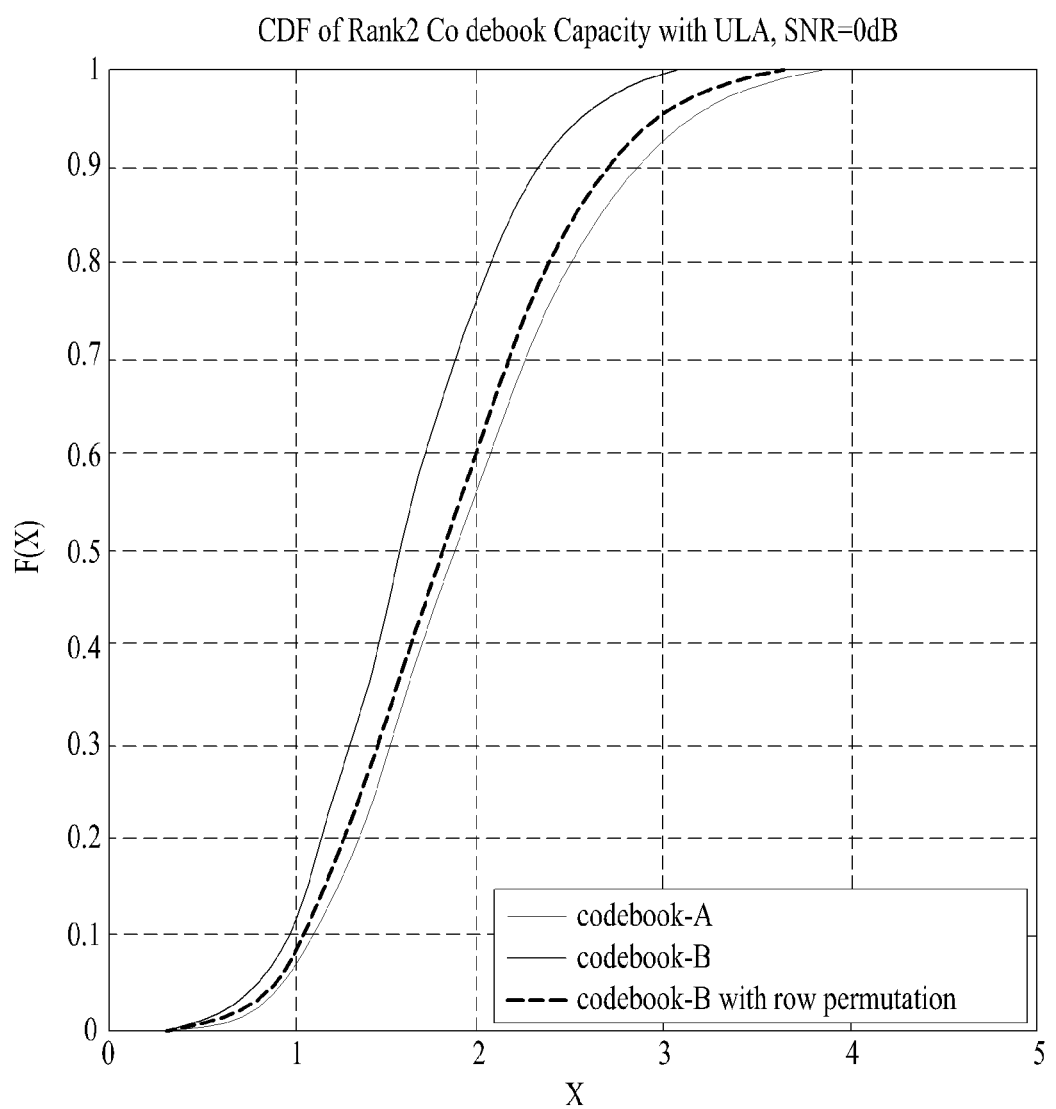

FIGS. 14 to 17 are diagrams of cumulative distribution function (CDF) of capacity of a rank 2 codebook capacity in consideration of cross-polarized antenna configuration. In particular, FIG. 14 shows a result on the assumption that SNR is set to 2 dB, FIG. 15 shows a result on the assumption that SNR is set to 4 dB, FIG. 16 shows a result on the assumption that SNR is set to 6 dB, and FIG. 17 shows a result on the assumption that SNR is set to 8 dB.

Figure 18:
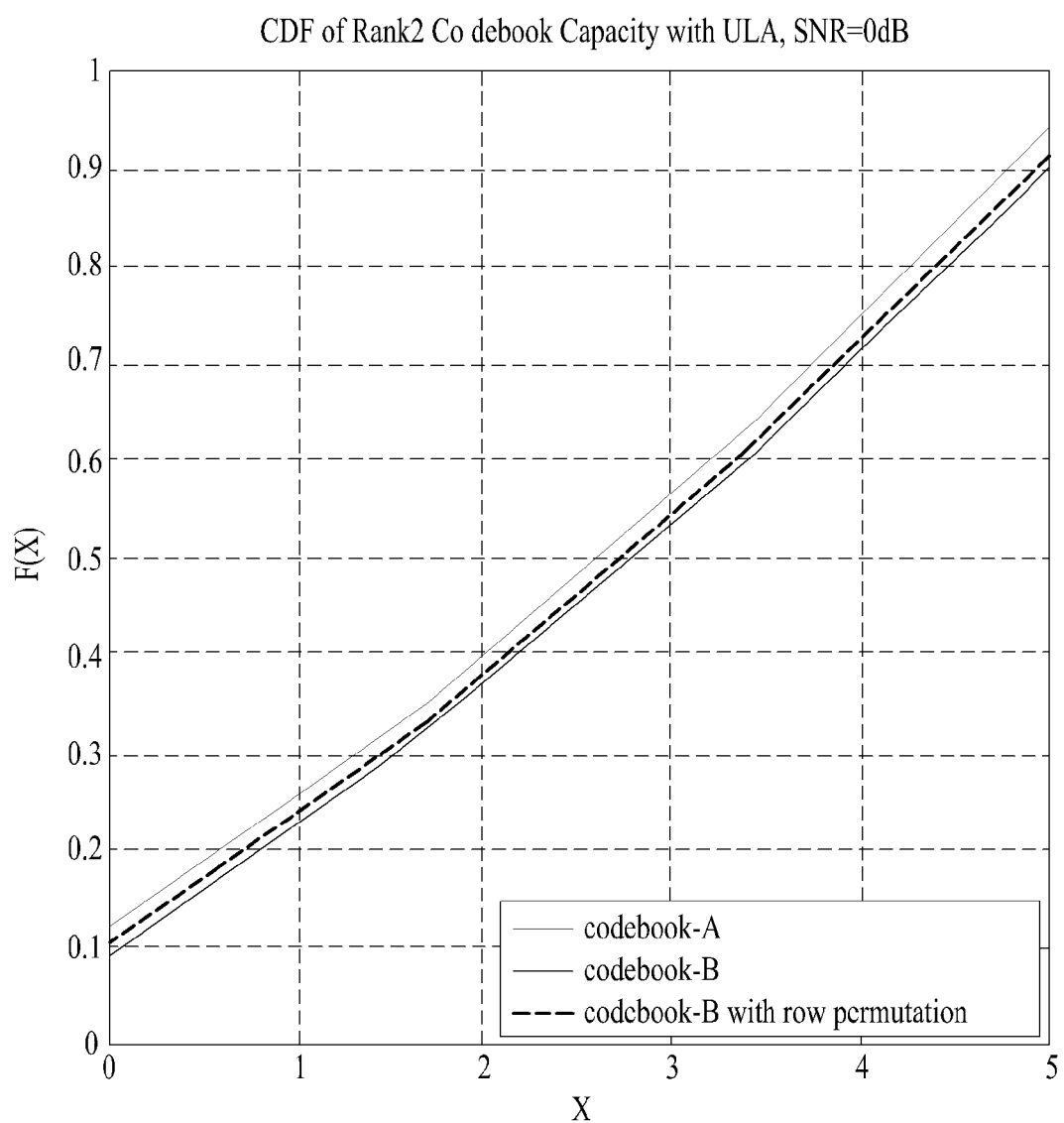

FIG. 18 shows an average of the rank 2 codebook capacity in consideration of ULA antenna configuration.

Figure 19:
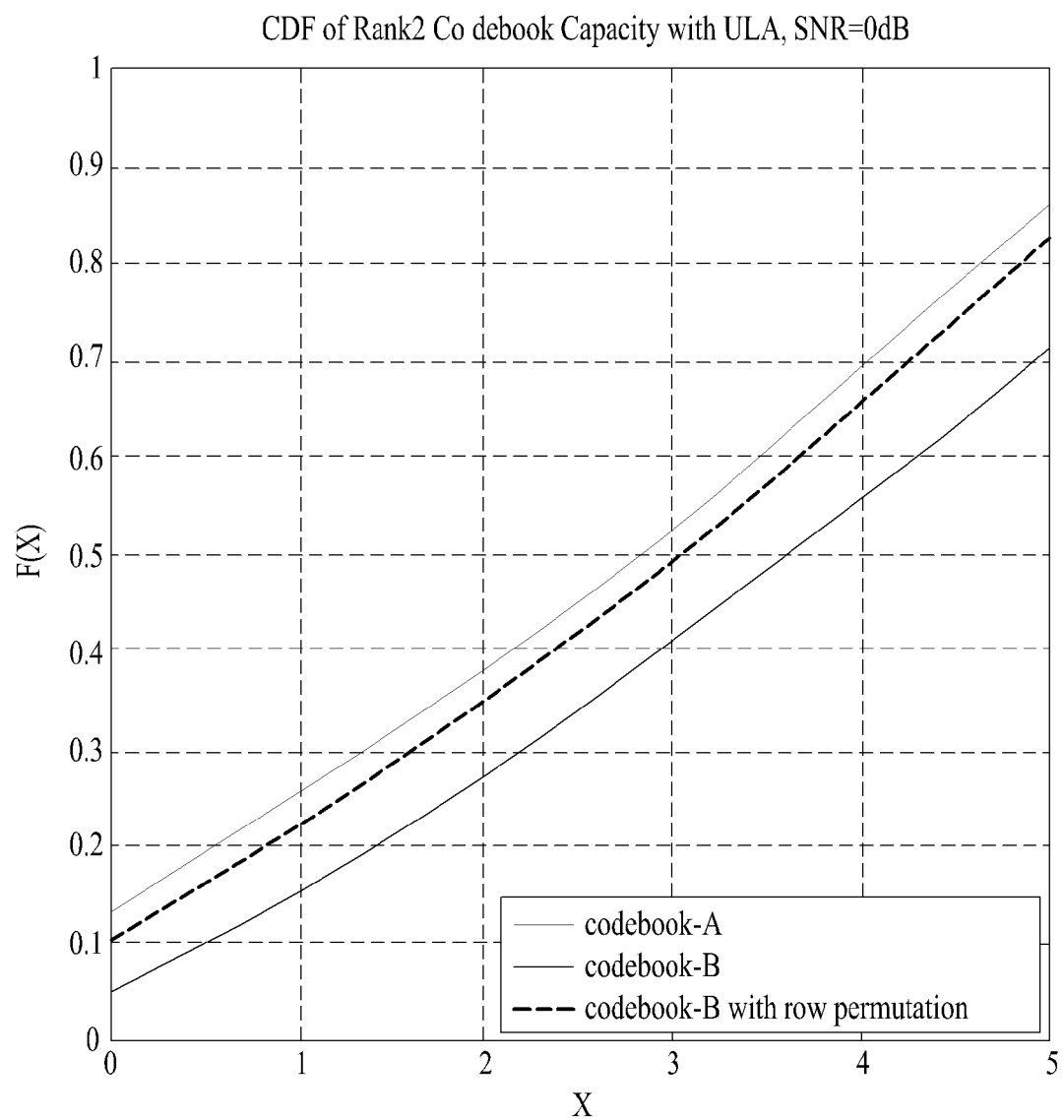

FIG. 19 shows an average of the rank 2 codebook capacity in consideration of the cross-polarized antenna configuration.

Looking into the simulation results shown in FIGS. 10 to 19, it can be observed that a codebook, which uses block diagonal matrixes for a rank 2 transmission, has better capacity enhancement. Hence, if the codebook including the block diagonal matrixes proposed in Table 4 by the present invention is used, it may be able to provide good capacity in 8-antenna transmission.

There are two kinds of codebook design schemes for DL 8-transmitting antenna closed loop MIMO transmission proposed by the present invention. In particular, one codebook design scheme is to strictly abide by the codebook design requirements, while the other is to give priority to achieving good capacity irrespective of antenna configuration (e.g., cross-polarized antenna configuration, high correlated antenna configuration, etc.). Referring to the link capacity comparisons shown in FIGS. 10 to 19, it may be preferable to consider a codebook optimized for the cross-polarized antenna. Moreover, base matrixes for the elements of the 8-transmitting antenna codebook in a single cell are defined by the present invention and a block diagonal matrix may be considered as one of the base matrixes for a codebook for a cross-polarized antenna configuration. A codebook according to the present invention may include codebook elements suitable for various antenna configurations as long as maintaining an appropriate size (e.g., 4-bit size, etc.).

In the following, Tables 6 to 8 relate to exemplary codes for generating DFT matrix used to configure 8-transmitting antenna codebook proposed by the present invention.

TABLE 6

```
clear;
for i=1:1:4
   T(:,:,i) = [1 1; exp(j*pi*(i-1)/4 ) -exp(j*pi*(i-1)/4)];
end
i=1; k=1; l=1;
m1=1; m2=1; m3=1; m4=1;
a=k;b=m1;c=m2;
temp1=[kron(T(:,1,a), T(:,:,b)), kron(T(:,2,a), T(:,:,c))];
a=l;b=m3;c=m4;
temp2=[kron(T(:,1,a), T(:,:,b)), kron(T(:,2,a), T(:,:,c))];
W1=[kron( T(:,1,i), temp1) , kron( T(:,2,i), temp2)]/sqrt(8);
i=2; k=4; l=4;
m1=4; m2=4; m3=4; m4=4;
a=k;b=m1;c=m2;
temp1=[kron(T(:,1,a), T(:,:,b)), kron(T(:,2,a), T(:,:,c))];
a=l;b=m3;c=m4;
temp2=[kron(T(:,1,a), T(:,:,b)), kron(T(:,2,a), T(:,:,c))];
W2=[kron( T(:,1,i), temp1) , kron( T(:,2,i), temp2)]/sqrt(8);
i=3; k=3; l=3;
m1=3; m2=3; m3=3; m4=3;
a=k;b=m1;c=m2;
temp1=[kron(T(:,1,a), T(:,:,b)), kron(T(:,2,a), T(:,:,c))];
a=l;b=m3;c=m4;
temp2=[kron(T(:,1,a), T(:,:,b)), kron(T(:,2,a), T(:,:,c))];
W3=[kron( T(:,1,i), temp1) , kron( T(:,2,i), temp2)]/sqrt(8);
i=4; k=2; l=2;
m1=2; m2=2; m3=2; m4=2;
a=k;b=m1;c=m2;
temp1=[kron(T(:,1,a), T(:,:,b)), kron(T(:,2,a), T(:,:,c))];
a=l;b=m3;c=m4;
temp2=[kron(T(:,1,a), T(:,:,b)), kron(T(:,2,a), T(:,:,c))];
W4=[kron( T(:,1,i), temp1) , kron( T(:,2,i), temp2)]/sqrt(8);
W(:,:,1) =W1(:,:);
W(:,:,2) =W2(:,:);
W(:,:,3) =W3(:,:);
W(:,:,4) =W4(:,:);
idx1=[1
2
7
8
1
2
7
8
3
4
5
6
1
2
7
8];
idx2=[ 1 5
2 6
3 7
4 8
1 3
2 4
5 7
6 8
3 7
4 8
1 5
2 6
1 3
2 4
5 7
6 8];
idx3=[1 3 5
2 4 6
1 3 7
2 4 8
1 3 4
2 4 5
5 7 8
1 6 8
1 3 7
2 4 8
1 5 7
2 6 8
1 3 4
2 4 6
5 7 8
1 6 8];
idx4=[1 3 5 7
2 4 6 8
1 3 7 8
2 4 7 8
1 2 3 4
2 4 5 7
1 5 7 8
1 6 8 3
1 3 7 8
1 2 4 8
1 3 5 7
2 4 6 8
1 2 3 4
2 4 5 6
5 6 7 8
1 6 7 8];
idx5=[1 3 5 6 7
2 4 5 6 8
1 3 4 7 8
2 3 4 7 8
1 2 3 4 7
2 3 4 5 7
1 4 5 7 8
1 3 5 6 8
1 3 4 7 8
1 2 4 5 8
1 3 5 6 7
2 3 4 6 8
1 2 3 4 5
2 4 5 6 7
2 5 6 7 8
1 3 6 7 8];
idx6=[1 2 3 5 6 7
1 2 4 5 6 8
1 3 4 5 7 8
2 3 4 6 7 8
1 2 3 4 6 7
2 3 4 5 7 8
1 4 5 6 7 8
1 2 3 5 6 8
1 3 4 5 7 8
1 2 4 5 6 8
```

TABLE 6-continued

```
1 2 3 5 6 7
2 3 4 6 7 8
1 2 3 4 5 8
1 2 4 5 6 7
2 3 5 6 7 8
1 3 4 6 7 8];
idx7=[1 2 3 4 5 6 7
1 2 3 4 5 6 8
1 3 4 5 6 7 8
2 3 4 5 6 7 8
1 2 3 4 5 6 7
2 3 4 5 6 7 8
1 3 4 5 6 7 8
1 2 3 4 5 6 8
1 2 3 4 5 7 8
1 2 4 5 6 7 8
1 2 3 5 6 7 8
1 2 3 4 6 7 8
1 2 3 4 5 6 8
1 2 3 4 5 6 7
2 3 4 5 6 7 8
1 3 4 5 6 7 8];
idx8=[1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8];
idx_col = zeros(16,8,8);
idx_col(:, 1:1:1, 1) = idx1(:,:);
idx_col(:, 1:1:2, 2) = idx2(:,:);
idx_col(:, 1:1:3, 3) = idx3(:,:);
idx_col(:, 1:1:4, 4) = idx4(:,:);
idx_col(:, 1:1:5, 5) = idx5(:,:);
idx_col(:, 1:1:6, 6) = idx6(:,:);
idx_col(:, 1:1:7, 7) = idx7(:,:);
idx_col(:, 1:1:8, 8) = idx8(:,:);
idx_w=[1 1 1 1 2 2 2 2 3 3 3 3 4 4 4 4];
rank=2;
temp_cb=zeros(8,rank,16);
for x=1:1:16
  for y=1:1:rank
    temp_cb(:,y, x) = W(:,idx_col(x, y, rank),idx_w(x));
  end
end
temp_cb(:, :, 1) =
    0.3536    0.3536
    0.3536    0.3536
    0.3536    0.3536
    0.3536    0.3536
    0.3536   −0.3536
    0.3536   −0.3536
    0.3536   −0.3536
    0.3536   −0.3536
temp_cb(:, :, 2) =
    0.3536    0.3536
   −0.3536   −0.3536
    0.3536    0.3536
   −0.3536   −0.3536
    0.3536   −0.3536
   −0.3536    0.3536
    0.3536   −0.3536
   −0.3536    0.3536
temp_cb(:, :, 3) =
    0.3536    0.3536
    0.3536    0.3536
   −0.3536   −0.3536
   −0.3536   −0.3536
    0.3536   −0.3536
    0.3536   −0.3536
   −0.3536    0.3536
   −0.3536    0.3536
temp_cb(:, :, 4) =
    0.3536    0.03536
   −0.3536   −0.3536
   −0.3536   −0.3536
    0.3536    0.3536
    0.3536   −0.3536
   −0.3536    0.3536
   −0.3536    0.3536
    0.3536   −0.3536
temp_cb(:, :, 5) =
    0.3536              0.3536
   −0.2500 + 0.2500i   −0.2500 + 0.2500i
   −0.2500 + 0.2500i    0.2500 − 0.2500i
   −0.0000 − 0.3536i    0.0000 + 0.3536i
    0.2500 + 0.2500i    0.2500 + 0.2500i
   −0.3536 + 0.0000i   −0.3536 + 0.0000i
   −0.3536 + 0.0000i    0.3536 − 0.0000i
    0.2500 − 0.2500i   −0.2500 + 0.2500i
temp_cb(:, :, 6) =
    0.3536              0.3536
    0.2500 − 0.2500i    0.2500 − 0.2500i
   −0.2500 + 0.2500i    0.2500 + 0.2500i
    0.0000 + 0.3536i   −0.0000 − 0.3536i
    0.2500 + 0.2500i    0.2500 + 0.2500i
    0.3536 − 0.0000i    0.3536 − 0.0000i
   −0.3536 + 0.0000i    0.3536 − 0.0000i
   −0.2500 + 0.2500i    0.2500 − 0.2500i
temp_cb(:, :, 7) =
    0.3536              0.3536
   −0.2500 + 0.2500i   −0.2500 + 0.2500i
   −0.2500 + 0.2500i    0.2500 − 0.2500i
   −0.0000 − 0.3536i    0.0000 + 0.3536i
   −0.2500 − 0.2500i   −0.2500 − 0.2500i
    0.3536 − 0.0000i    0.3536 − 0.0000i
    0.3536 − 0.0000i   −0.3536 + 0.0000i
   −0.2500 + 0.2500i    0.2500 − 0.2500i
temp_cb(:, :, 8) =
    0.3536              0.3536
    0.2500 − 0.2500i    0.2500 − 0.2500i
   −0.2500 + 0.2500i    0.2500 − 0.2500i
    0.0000 + 0.3536i   −0.0000 − 0.3536i
   −0.2500 − 0.2500i   −0.2500 − 0.2500i
   −0.3536 + 0.0000i   −0.3536 + 0.0000i
    0.3536 − 0.0000i   −0.3536 + 0.0000i
    0.2500 − 0.2500i    0.2500 − 0.2500i
temp_cb(:, :, 9) =
    0.3536              0.3536
    0.0000 + 0.3536i    0.0000 + 0.3536i
   −0.0000 − 0.3536i   −0.0000 − 0.3536i
    0.3536 − 0.0000i    0.3536 − 0.0000i
    0.0000 + 0.3536i   −0.0000 − 0.3536i
   −0.3536 + 0.0000i    0.3536 − 0.0000i
    0.3536 − 0.0000i   −0.3536 + 0.0000i
    0.0000 + 0.3536i   −0.0000 − 0.3536i
temp_cb(:, :, 10) =
    0.3536              0.3536
   −0.0000 − 0.3536i   −0.0000 − 0.3536i
   −0.0000 − 0.3536i   −0.0000 − 0.3536i
   −0.3536 + 0.0000i   −0.3536 + 0.0000i
    0.0000 + 0.3536i   −0.0000 − 0.3536i
    0.3536 − 0.0000i   −0.3536 + 0.0000i
    0.3536 − 0.0000i   −0.3536 + 0.0000i
   −0.0000 − 0.3536i    0.0000 + 0.3536i
temp_cb(:, :, 11) =
    0.3536              0.3536
    0.0000 + 0.3536i    0.0000 + 0.3536i
    0.0000 + 0.3536i    0.0000 + 0.3536i
   −0.3536 + 0.0000i   −0.3536 + 0.0000i
    0.0000 + 0.3536i    0.0000 + 0.3536i
   −0.3536 + 0.0000i    0.3536 − 0.0000i
   −0.3536 + 0.0000i    0.3536 − 0.0000i
   −0.0000 − 0.3536i    0.0000 + 0.3536i
temp_cb(:, :, 12) =
    0.3536              0.3536
   −0.0000 − 0.3536i   −0.0000 − 0.3536i
    0.0000 + 0.3536i    0.0000 + 0.3536i
    0.3536 − 0.0000i    0.3536 − 0.0000i
    0.0000 + 0.3536i   −0.0000 − 0.3536i
```

TABLE 6-continued

```
             0.3536 − 0.0000i   −0.3536 + 0.0000i
            −0.3536 + 0.0000i    0.3536 − 0.0000i
             0.0000 + 0.3536i   −0.0000 − 0.3536i
temp_cb(:, :, 13) =
             0.3536             0.3536
             0.2500 + 0.2500i    0.2500 + 0.2500i
             0.2500 + 0.2500i   −0.2500 − 0.2500i
             0.0000 + 0.3536i   − 0.0000 − 0.3536i
            −0.2500 + 0.2500i   −0.2500 + 0.2500i
            −0.3536 + 0.0000i   −0.3536 + 0.0000i
            −0.3536 + 0.0000i    0.3536 − 0.0000i
            −0.2500 − 0.2500i    0.2500 + 0.2500i
temp_cb(:, :, 14) =
             0.356              0.3536
            −0.2500 − 0.2500i   −0.2500 − 0.2500i
             0.2500 + 0.2500i   −0.2500 − 0.2500i
            −0.0000 − 0.3536i    0.0000 + 0.3536i
            −0.2500 + 0.2500i   −0.2500 + 0.2500i
             0.3536 − 0.0000i    0.3536 − 0.0000i
            −0.3536 + 0.0000i    0.3536 − 0.0000i
             0.2500 − 0.2500i   −0.2500 − 0.2500i
temp_cb(:, :, 15) =
             0.3536             0.3536
             0.2500 + 0.2500i    0.2500 + 0.2500i
             0.2500 + 0.2500i   −0.2500 − 0.2500i
             0.0000 + 0.3536i   −0.0000 − 0.3536i
             0.2500 − 0.2500i    0.2500 − 0.2500i
             0.3536 − 0.0000i    0.3536 − 0.0000i
             0.3536 − 0.0000i   −0.3536 + 0.0000i
             0.2500 − 0.2500i   −0.2500 − 0.2500i
temp_cb(:, :, 16) =
             0.3536             0.3536
            −0.2500 − 0.2500i   −0.2500 − 0.2500i
             0.2500 + 0.2500i   −0.2500 − 0.2500i
            −0.0000 − 0.3536i    0.0000 + 0.3536i
             0.2500 − 0.2500i    0.2500 − 0.2500i
            −0.3536 + 0.0000i   −0.3536 + 0.0000i
             0.3536 − 0.0000i   −0.3536 + 0.0000i
            −0.2500 + 0.2500i    0.2500 + 0.2500i
```

TABLE 7

```
clear;
for i=1:1:4
  T(:,:,i) = [ 1 1; exp(j*pi*(i−1)/4) −exp(j*pi(i−1)/4)];
end
i=1; k=1; l=1;
m1=1; m2=1; m3=1; m4=1;
a=k;b=m1;c=m2;
temp1=[kron(T(:,1,a), T(:,:,b)), kron(T(:,2,a), T(:,:,c))];
a=1;b=m3;c=m4;
temp2=[kron(T(:,1,a), T(:,:,b)), kron(T(:,2,a), T(:,:,c))];
W1=[kron( T(:,1,i), temp1) , kron( T(:,2,i), temp2)]/sqrt(8);
i=2; k=4; l=4;
m1=4; m2=4; m3=4; m4=4;
a=k;b=m1;c=m2;
temp1=[kron(T(:,1,a), T(:,:,b)), kron(T(:,2,a), T(:,:,c))];
a=1;b=m3;c=m4;
temp2=[kron(T(:,1,a), T(:,:,b)), kron(T(:,2,a), T(:,:,c))];
W2=[kron( T(:,1,i), temp1) , kron( T(:,2,i), temp2)]/sqrt(8);
i=3; k=3; l=3;
m1=3; m2=3; m3=3; m4=3;
a=k;b=m1;c=m2;
temp1=[kron(T(:,1,a), T(:,:,b)), kron(T(:,2,a), T(:,:,c))];
a=1;b=m3;c=m4;
temp2=[kron(T(:,1,a), T(:,:,b)), kron(T(:,2,a), T(:,:,c))];
W3=[kron( T(:,1,i), temp1) , kron( T(:,2,i), temp2)]/sqrt(8);
i=4; k=2; l=2;
m1=2; m2=2; m3=2; m4=2;
a=k;b=m1;c=m2;
temp1=[kron(T(:,1,a), T(:,:,b)), kron(T(:,2,a), T(:,:,c))];
a=1;b=m3;c=m4;
temp2=[kron(T(:,1,a), T(:,:,b)), kron(T(:,2,a), T(:,:,c))];
W4=[kron( T(:,1,i), temp1) , kron( T(:,2,i), temp2)]/sqrt(8);
P=[1                 0              0     0
                     0              0     0
                     0
   0                 0              0     0
                     1              0     0
                     0
   0                 1              0     0
                     0              0     0
                     0
   0                 0              0     0
                     0              1     0
                     0
   0                 0              1     0
                     0              0     0
                     0
   0                 0              0     0
                     0              0     1
                     0
   0                 0              0     1
                     0              0     0
                     0
   0                 0              0     0
                     0              0     0
                     1];
W(:,:,1) =P*W1(:,:);
W(:,:,2) =P*W2(:,:);
W(:,:,3) =P*W3(:,:);
W(:,:,4) =P*W4(:,:);
idx1=[1
2
7
8
1
2
7
8
3
4
5
6
1
2
7
8];
idx2=[ 1 5
2 6
3 7
4 8
1 3
2 4
5 7
6 8
3 7
4 8
1 5
2 6
1 3
2 4
5 7
6 8];
idx3=[1 3 5
2 4 6
1 3 7
2 4 8
1 3 4
2 4 5
5 7 8
1 6 8
1 3 7
2 4 8
1 5 7
2 6 8
1 3 4
2 4 6
5 7 8
1 6 8];
idx4=[ 1 3 5 7
2 4 6 8
1 3 7 8
2 4 7 8
1 2 3 4
2 4 5 7
1 5 7 8
```

TABLE 7-continued

```
1 6 8 3
1 3 7 8
1 2 4 8
1 3 5 7
2 4 6 8
1 2 3 4
2 4 5 6
5 6 7 8
1 6 7 8];
idx5=[1 3 5 6 7
2 4 5 6 8
1 3 4 7 8
2 3 4 7 8
1 2 3 4 7
2 3 4 5 7
1 4 5 7 8
1 3 5 6 8
1 3 4 7 8
1 2 4 5 8
1 3 5 6 7
2 3 4 6 8
1 2 3 4 5
2 4 5 6 7
2 5 6 7 8
1 3 6 7 8];
idx6=[1 2 3 5 6 7
1 2 4 5 6 8
1 3 4 5 7 8
2 3 4 6 7 8
1 2 3 4 6 7
2 3 4 5 7 8
1 4 5 6 7 8
1 2 3 5 6 8
1 3 4 5 7 8
1 2 4 5 6 8
1 2 3 5 6 7
2 3 4 6 7 8
1 2 3 4 5 8
1 2 4 5 6 7
2 3 5 6 7 8
1 3 4 6 7 8];
idx7=[1 2 3 4 5 6 7
1 2 3 4 5 6 8
1 3 4 5 6 7 8
2 3 4 5 6 7 8
1 2 3 4 5 6 7
2 3 4 5 6 7 8
1 3 4 5 6 7 8
1 2 3 4 5 6 8
1 2 3 4 5 7 8
1 2 4 5 6 7 8
1 2 3 5 6 7 8
1 2 3 4 6 7 8
1 2 3 4 5 6 8
1 2 3 4 5 6 7
2 3 4 5 6 7 8
1 3 4 5 6 7 8];
idx8=[1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8
1 2 3 4 5 6 7 8];
idx_col = zeros(16,8,8);
idx_col(:, 1:1:1, 1) = idx1(:,:);
idx_col(:, 1:1:2, 2) = idx2(:,:);
idx_col(:, 1:1:3, 3) = idx3(:,:);
idx_col(:, 1:1:4, 4) = idx4(:,:);
idx_col(:, 1:1:5, 5) = idx5(:,:);
idx_col(:, 1:1:6, 6) = idx6(:,:);
idx_col(:, 1:1:7, 7) = idx7(:,:);
idx_col(:, 1:1:8, 8) = idx8(:,:);
idx_w=[1 1 1 1 2 2 2 2 3 3 3 3 4 4 4 4];
rank=2;
temp_cb=zeros(8,rank,16);
for x=1:1:16
  for y=1:1:rank
    temp_cb(:,y, x) = W(:,idx_col(x, y, rank),idx_w(x));
  end
end
temp_cb(:,:,1) =
   0.3536    0.3536
   0.3536   -0.3536
   0.3536    0.3536
   0.3536   -0.3536
   0.3536    0.3536
   0.3536   -0.3536
   0.3536    0.3536
   0.3536   -0.3536
temp_cb(:,:,2) =
   0.3536    0.3536
   0.3536    0.3536
  -0.3536   -0.3536
  -0.3536    0.3536
   0.3536    0.3536
   0.3536   -0.3536
  -0.3536   -0.3536
  -0.3536    0.3536
temp_cb(:,:,3) =
   0.3536    0.3536
   0.3536    0.3536
   0.3536   -0.3536
   0.3536   -0.3536
  -0.3536   -0.3536
  -0.3536    0.3536
  -0.3536   -0.3536
  -0.3536    0.3536
temp_cb(:,:,4) =
   0.3536    0.3536
   0.3536   -0.3536
  -0.3536   -0.3536
  -0.3536    0.3536
  -0.3536   -0.3536
  -0.3536    0.3536
   0.3536    0.3536
   0.3536   -0.3536
temp_cb(:,:,5) =
   0.3536            0.3536
   0.2500 + 0.2500i   0.2500 + 0.2500i
  -0.2500 + 0.2500i  -0.2500 + 0.2500i
  -0.3536 + 0.0000i  -0.3536 + 0.0000i
  -0.2500 + 0.2500i   0.2500 - 0.2500i
  -0.3536 + 0.0000i   0.3536 - 0.0000i
  -0.0000 - 0.3536i   0.0000 + 0.3536i
   0.2500 - 0.2500i  -0.2500 + 0.2500i
temp_cb(:,:,6) =
   0.3536            0.3536
   0.2500 + 0.2500i   0.2500 + 0.2500i
   0.2500 - 0.2500i   0.2500 - 0.2500i
   0.3536 - 0.0000i   0.3536 - 0.0000i
  -0.2500 + 0.2500i   0.2500 - 0.2500i
  -0.3536 + 0.0000i   0.3536 - 0.0000i
   0.0000 + 0.3536i  -0.0000 - 0.3536i
  -0.2500 + 0.2500i   0.2500 - 0.2500i
temp_cb(:,:,7) =
   0.3536            0.3536
  -0.2500 - 0.2500i  -0.2500 - 0.2500i
  -0.2500 + 0.2500i  -0.2500 + 0.2500i
   0.3536 - 0.0000i   0.3536 - 0.0000i
  -0.2500 + 0.2500i   0.2500 - 0.2500i
   0.3536 - 0.0000i  -0.3536 + 0.0000i
  -0.0000 - 0.3536i   0.0000 + 0.3536i
  -0.2500 + 0.2500i   0.2500 - 0.2500i
temp_cb(:,:,8) =
   0.3536            0.3536
  -0.2500 - 0.2500i  -0.2500 - 0.2500i
   0.2500 - 0.2500i   0.2500 - 0.2500i
  -0.3536 + 0.0000i  -0.3536 + 0.0000i
  -0.2500 + 0.2500i   0.2500 - 0.2500i
   0.3536 - 0.0000i  -0.3536 + 0.0000i
```

TABLE 7-continued

```
                 0.0000 + 0.3536i     -0.0000 - 0.3536i
                 0.2500 - 0.2500i     -0.2500 + 0.2500i
temp_cb(:,:,9) =
    0.3536           0.3536
    0.0000 + 0.3536i    -0.0000 - 0.3536i
    0.0000 + 0.3536i     0.0000 + 0.3536i
   -0.3536 + 0.0000i     0.3536 - 0.0000i
   -0.0000 - 0.3536i     0.0000 + 0.3536i
    0.3536 - 0.0000i    -0.3536 + 0.0000i
    0.3536 - 0.0000i     0.3536 - 0.0000i
    0.0000 + 0.3536i    -0.0000 - 0.3536i
temp_cb(:,:,10) =
    0.3536           0.3536
    0.0000 + 0.3536i    -0.0000 - 0.3536i
   -0.0000 - 0.3536i    -0.0000 - 0.3536i
    0.3536 - 0.0000i    -0.3536 + 0.0000i
   -0.0000 - 0.3536i    -0.0000 - 0.3536i
    0.3536 - 0.0000i    -0.3536 + 0.0000i
   -0.3536 + 0.0000i    -0.3536 + 0.0000i
   -0.0000 - 0.3536i     0.0000 + 0.3536i
temp_cb(:,:,11) =
    0.3536           0.3536
    0.0000 + 0.3536i    -0.0000 - 0.3536i
    0.0000 + 0.3536i     0.0000 + 0.3536i
   -0.3536 + 0.0000i     0.3536 - 0.0000i
    0.0000 + 0.3536i     0.0000 + 0.3536i
   -0.3536 + 0.0000i     0.3536 - 0.0000i
   -0.3536 + 0.0000i    -0.3536 + 0.0000i
   -0.0000 - 0.3536i     0.0000 + 0.3536i
temp_cb(:,:,12) =
    0.3536           0.3536
    0.0000 + 0.3536i    -0.0000 - 0.3536i
   -0.0000 - 0.3536i    -0.0000 - 0.3536i
    0.3536 - 0.0000i     0.3536 - 0.0000i
   -0.0000 - 0.3536i     0.0000 + 0.3536i
    0.3536 - 0.0000i     0.3536 - 0.0000i
    0.3536 - 0.0000i     0.3536 - 0.0000i
    0.0000 + 0.3536i    -0.0000 - 0.3536i
temp_cb(:,:,13) =
    0.3536           0.3536
   -0.2500 + 0.2500i    -0.2500 + 0.2500i
    0.2500 + 0.2500i     0.2500 + 0.2500i
   -0.3536 + 0.0000i    -0.3536 + 0.0000i
    0.2500 + 0.2500i    -0.2500 - 0.2500i
   -0.3536 + 0.0000i     0.3536 - 0.0000i
    0.0000 + 0.3536i    -0.0000 - 0.3536i
   -0.2500 - 0.2500i     0.2500 + 0.2500i
temp_cb(:,:,14) =
    0.3536           0.3536
   -0.2500 + 0.2500i    -0.2500 + 0.2500i
   -0.2500 - 0.2500i    -0.2500 - 0.2500i
    0.3536 - 0.0000i     0.3536 - 0.0000i
    0.2500 + 0.2500i    -0.2500 - 0.2500i
   -0.3536 + 0.0000i     0.3536 - 0.0000i
   -0.0000 - 0.3536i     0.0000 + 0.3536i
    0.2500 + 0.2500i    -0.2500 - 0.2500i
temp_cb(:,:,15) =
    0.3536           0.3536
    0.2500 - 0.2500i     0.2500 - 0.2500i
    0.2500 + 0.2500i     0.2500 + 0.2500i
    0.3536 - 0.0000i     0.3536 - 0.0000i
    0.2500 + 0.2500i    -0.2500 - 0.2500i
    0.3536 - 0.0000i    -0.3536 + 0.0000i
    0.0000 + 0.3536i    -0.0000 - 0.3536i
    0.2500 + 0.2500i    -0.2500 - 0.2500i
temp_cb(:,:,16) =
    0.3536           0.3536
    0.2500 - 0.2500i     0.2500 - 0.2500i
   -0.2500 - 0.2500i    -0.2500 - 0.2500i
   -0.3536 + 0.0000i    -0.3536 + 0.0000i
    0.2500 + 0.2500i     0.2500 + 0.2500i
    0.3536 - 0.0000i    -0.3536 + 0.0000i
   -0.0000 - 0.3536i     0.0000 + 0.3536i
   -0.2500 - 0.2500i     0.2500 + 0.2500i
```

In Table 7, P means a permutation matrix and a precoding matrix may be able to enhance capacity by row permutation.

The P matrix may be configured in accordance with antenna indexing. And, the P matrix may be configured as described in Table 4.

TABLE 8

```
clear;
K=[ 1 1; 1 -1];
u0=transpose([1 -1 -1 -1]);
u1=transpose([1 -j 1 j]);
u2=transpose([1 1 -1 1]);
u3=transpose([1 j 1 -j]);
u4=transpose([1 (-1-j)/sqrt(2) -j (1-j)/sqrt(2)]);
u5=transpose([1 (1-j)/sqrt(2) j (-1-j)/sqrt(2)]);
u6=transpose([1 (1+j)/sqrt(2) -j (-1+j)/sqrt(2)]);
u7=transpose([1 (-1+j)/sqrt(2) j (1+j)/sqrt(2)]);
u8=transpose([1 -1 1 1]);
u9=transpose([1 -j -1 -j]);
u10=transpose([1 1 1 -1]);
u11=transpose([1 j -1 j]);
u12=transpose([1 -1 -1 1]);
u13=transpose([1 -1 1 -1]);
u14=transpose([1 1 -1 -1]);
u15=transpose([1 1 1 1]);
u(:,1)=u0;u(:,2)=u1;u(:,3)=u2;u(:,4)=u3;
u(:,5)=u4;u(:,6)=u5;u(:,7)=u6;u(:,8)=u7;
u(:,9)=u8;u(:,10)=u9;u(:,11)=u10;u(:,12)=u11;
u(:,13)=u12;u(:,14)=u13;u(:,15)=u14;u(:,16)=u15;
W=zeros(4,4,16);
m=zeros(8,8,16);
for i=1:1:16
    temp1=u(:,i)*u(:,i)';
    temp2=u(:,i)'*u(:,i);
    W(:,:,i)=eye(4)-2*(temp1)/(temp2);
    m(:,:,i)=kron(K,W(:,:,i)) / sqrt(2);
end
M0=m(:,:,1);M1=m(:,:,2);M2=m(:,:,3);M3=m(:,:,4);
M4=m(:,:,5);M5=m(:,:,6);M6=m(:,:,7);M7=m(:,:,8);
M8=m(:,:,9);M9=m(:,:,10);M10=m(:,:,11);M11=m(:,:,12);
M12=m(:,:,13);M13=m(:,:,14);M14=m(:,:,15);M15=m(:,:,16);
A=[sqrt(2)*eye(4) zeros(4,4); zeros(4,4) zeros(4,4)];
B=[zeros(4,4) zeros(4,4); zeros(4,4) sqrt(2)*eye(4)];
q0=(1+j)/sqrt(2);
q1=(-1+j)/sqrt(2);
q2=-(1+j)/sqrt(2);
q3=(1-j)/sqrt(2);
P1=[eye(4) zeros(4,4); zeros(4,4) q2*eye(4)];
P2=[eye(4) zeros(4,4); zeros(4,4) -j*eye(4)];
P3=[eye(4) zeros(4,4); zeros(4,4) q3*eye(4)];
P=[1 0 0 0 0 0 0 0
   0 0 0 0 1 0 0 0
   0 1 0 0 0 0 0 0
   0 0 0 0 0 1 0 0
   0 0 1 0 0 0 0 0
   0 0 0 0 0 0 1 0
   0 0 0 1 0 0 0 0
   0 0 0 0 0 0 0 1];
% Rank2
temp_cb = zeros(8,2,16);
temp_cb(:,1,1) = P*A*M0(:,1);    temp_cb(:,2,1) = P*B*M0(:,5);
temp_cb(:,1,2) = P*A*M1(:,1);    temp_cb(:,2,2) = P*B*M1(:,5);
temp_cb(:,1,3) = P*A*M2(:,1);    temp_cb(:,2,3) = P*B*M2(:,5);
temp_cb(:,1,4) = P*A*M3(:,1);    temp_cb(:,2,4) = P*B*M3(:,5);
temp_cb(:,1,5) = P*A*M4(:,1);    temp_cb(:,2,5) = P*B*M4(:,5);
temp_cb(:,1,6) = P*A*M5(:,1);    temp_cb(:,2,6) = P*B*M5(:,5);
```

TABLE 8-continued

```
temp_cb(:,1,7) = P*A*M6(:,1);    temp_cb(:,2,7) = P*B*M6(:,5);
temp_cb(:,1,8) = P*A*M7(:,1);    temp_cb(:,2,8) = P*B*M7(:,5);
temp_cb(:,1,9) = P*M8(:,1);      temp_cb(:,2,9) = P*M8(:,5);
temp_cb(:,1,10) = P*M9(:,1);     temp_cb(:,2,10) = P*M9(:,5);
temp_cb(:,1,11) = P*M10(:,1);    temp_cb(:,2,11) = P*M10(:,5);
temp_cb(:,1,12) = P*M11(:,1);    temp_cb(:,2,12) = P*M11(:,5);
temp_cb(:,1,13) = P*M12(:,1);    temp_cb(:,2,13) = P*M12(:,5);
temp_cb(:,1,14) = P*M13(:,1);    temp_cb(:,2,14) = P*M13(:,5);
temp_cb(:,1,15) = P*M14(:,1);    temp_cb(:,2,15) = P*M14(:,5);
temp_cb(:,1,16) = P*M15(:,1);    temp_cb(:,2,16) = P*M15(:,5);
temp_cb(:,:,1) =
   0.5000       0
   0           -0.5000
   0.5000       0
   0           -0.5000
   0.5000       0
   0           -0.5000
   0.5000       0
   0           -0.5000
temp_cb(:,:,2) =
   0.5000       0
   0           -0.5000
   0 + 0.5000i  0
   0            0 - 0.5000i
  -0.5000       0
   0            0.5000
   0 - 0.5000i  0
   0            0 + 0.5000i
temp_cb(:,:,3) =
   0.5000       0
   0           -0.5000
  -0.5000       0
   0            0.5000
   0.5000       0
   0           -0.5000
  -0.5000       0
   0            0.5000
temp_cb(:,:,4) =
   0.5000       0
   0           -0.5000
   0 - 0.5000i  0
   0            0 + 0.5000i
  -0.5000       0
   0            0.5000
   0 + 0.5000i  0
   0            0 - 0.5000i
temp_cb(:,:,5) =
   0.5000              0
   0                  -0.5000
   0.3536 + 0.3536i    0
   0                  -0.3536 - 0.3536i
   0 + 0.5000i         0
   0                   0 - 0.5000i
  -0.3536 + 0.3536i    0
   0                   0.3536 - 0.3536i
temp_cb(:,:,6) =
   0.5000              0
   0                  -0.5000
  -0.3536 + 0.3536i    0
   0                   0.3536 - 0.3536i
   0 - 0.5000i         0
   0                   0 + 0.5000i
   0.3536 + 0.3536i    0
   0                  -0.3536 - 0.3536i
temp_cb(:,:,7) =
   0.5000              0
   0                  -0.5000
  -0.3536 - 0.3536i    0
   0                   0.3536 + 0.3536i
   0 + 0.5000i         0
   0                   0 - 0.5000i
   0.3536 - 0.3536i    0
   0                  -0.3536 + 0.3536i
temp_cb(:,:,8) =
   0.5000              0
   0                  -0.5000
   0.3536 - 0.3536i    0
   0                  -0.3536 + 0.3536i
   0 - 0.5000i         0
   0                   0 + 0.5000i
  -0.3536 - 0.3536i    0
   0                   0.3536 + 0.3536i
temp_cb(:,:,9) =
   0.3536       0.3536
   0.3536      -0.3536
   0.3536       0.3536
   0.3536      -0.3536
  -0.3536      -0.3536
  -0.3536       0.3536
  -0.3536      -0.3536
  -0.3536       0.3536
temp_cb(:,:,10) =
   0.3536       0.3536
   0.3536      -0.3536
   0 + 0.3536i  0 + 0.3536i
   0 + 0.3536i  0 - 0.3536i
   0.3536       0.3536
   0.3536      -0.3536
   0 + 0.3536i  0 + 0.3536i
   0 + 0.3536i  0 - 0.3536i
temp_cb(:,:,11) =
   0.3536       0.3536
   0.3536      -0.3536
  -0.3536      -0.3536
  -0.3536       0.3536
  -0.3536      -0.3536
  -0.3536       0.3536
   0.3536       0.3536
   0.3536      -0.3536
temp_cb(:,:,12) =
   0.3536              0.3536
   0.3536             -0.3536
   0 - 0.3536i         0 - 0.3536i
   0 - 0.3536i         0 + 0.3536i
   0.3536              0.3536
   0.3536             -0.3536
   0 - 0.3536i         0 - 0.3536i
   0 - 0.3536i         0 + 0.3536i
temp_cb(:,:,13) =
   0.3536       0.3536
   0.3536      -0.3536
   0.3536       0.3536
   0.3536      -0.3536
   0.3536       0.3536
   0.3536      -0.3536
  -0.3536      -0.3536
  -0.3536       0.3536
temp_cb(:,:,14) =
   0.3536       0.3536
temp_cb(:,:,8) =
   0.5000              0
   0                  -0.5000
   0.3536 - 0.3536i    0
   0                  -0.3536 + 0.3536i
   0 - 0.5000i         0
   0                   0 + 0.5000i
  -0.3536 - 0.3536i    0
   0                   0.3536 + 0.3536i
temp_cb(:,:,9) =
   0.3536       0.3536
   0.3536      -0.3536
   0.3536       0.3536
   0.3536      -0.3536
  -0.3536      -0.3536
  -0.3536       0.3536
  -0.3536      -0.3536
  -0.3536       0.3536
temp_cb(:,:,10) =
   0.3536       0.3536
   0.3536      -0.3536
   0 + 0.3536i  0 + 0.3536i
   0 + 0.3536i  0 - 0.3536i
   0.3536       0.3536
   0.3536      -0.3536
   0 + 0.3536i  0 + 0.3536i
   0 + 0.3536i  0 - 0.3536i
temp_cb(:,:,11) =
```

Figure 20:
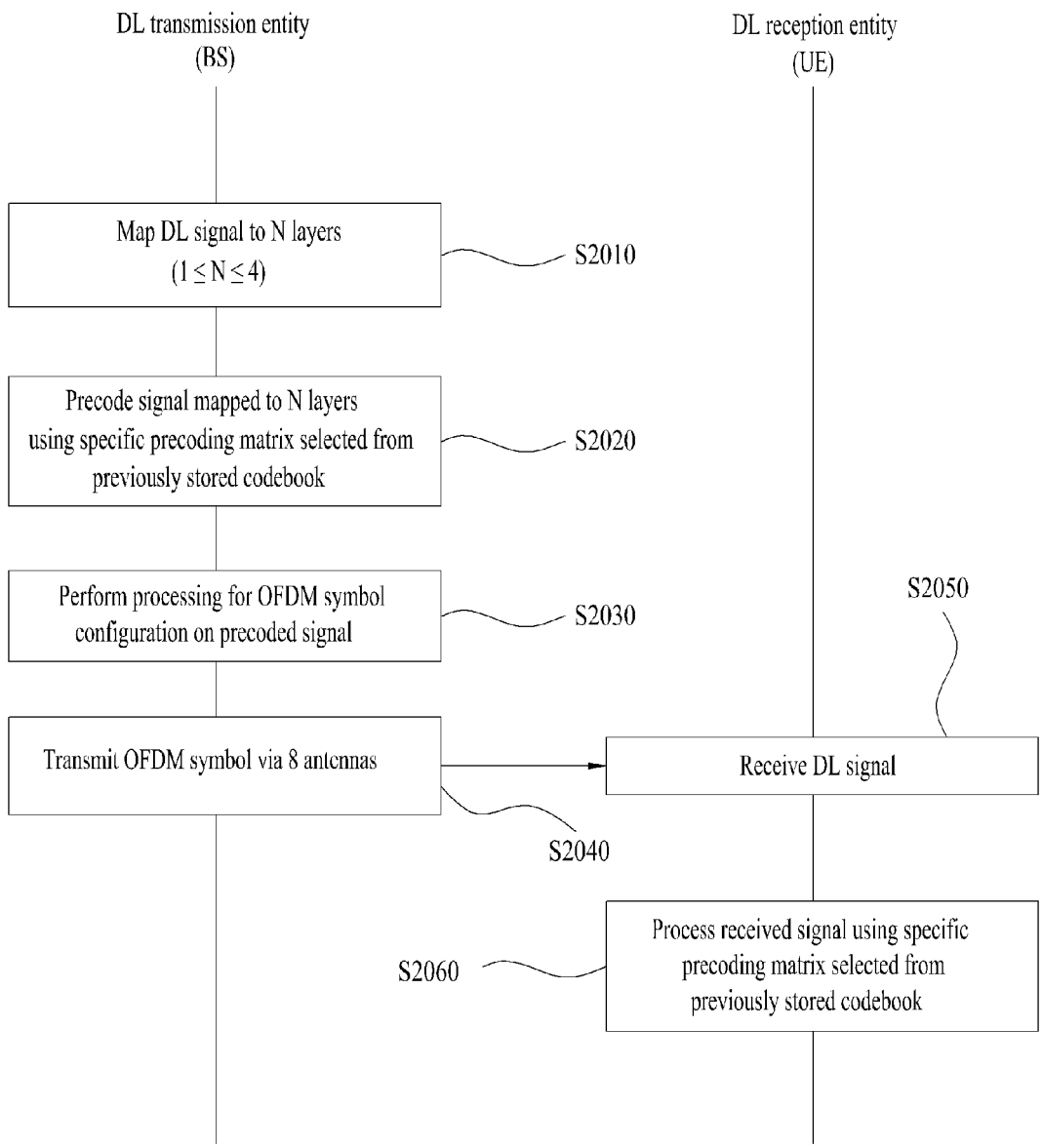
FIG. 20 is a diagram for describing MIMO based DL signal transceiving method according to one embodiment of the present invention.

In the following description, an MIMO based DL signal transceiving method according to one embodiment of the present invention is explained with reference to FIG. 20. In FIG. 20, a DL transmission entity (e.g., a base station) may be able to transmit a DL signal via 8 transmitting antennas and a DL reception entity (e.g., a user equipment) may be able to receive the DL signal transmitted from the DL transmission entity.

In the step S2010, the DL transmission entity may be able to map a signal, which is to be transmitted in DL, to N layers (where, 1≤N≤4). Since the number of layers corresponds to a rank value, the DL transmission via the N layers may be represented as a rank N DL transmission.

In the step S2020, the DL transmission entity is able to precode the signal mapped to the N layers. This precoding may be performed using a specific precoding matrix selected from a previously stored codebook. This codebook is shared between the DL transmission entity and a DL reception entity and the specific precoding matrix can be selected from the codebook based on PMI from the DL reception entity.

A scheme for the DL reception entity to determine the PMI may follow the example described with reference to FIG. 7. Yet, a detailed method for the DL reception entity to determine and feed back the PMI may not belong to the scope of the present invention and various kinds of methods for determining and feeding back PMI may be applicable to the present invention.

The codebook may include precoding matrixes for the N ranks, respectively. The codebook consists of 16 codebook indexes. And, a portion of the precoding matrixes for higher ranks for the 16 codebook indexes may include precoding matrixes for low ranks. In the codebook, the precoding matrixes of the codebook indexes 1 to 8 for the rank 2 may have linear configuration, while the precoding matrixes for the codebook indexes 9 to 16 for the rank 2 may have block diagonal configuration. The precoding matrixes of the codebook indexes 1 to 8 for the rank 1 transmission may consist of different column vectors of a prescribed 8×8 matrix, respectively. And, the precoding matrixes of the codebook indexes 9 to 16 for the rank 1 transmission may consist of different column vectors of a matrix permutated from the prescribed 8×8 matrix, respectively. For instance, the codebook may include the former codebook shown in Table 4 proposed by the present invention.

In the step S2030, the DL transmission entity performs a processing for OFDM symbol configuration on the precoded signal. In the step S2040, the DL transmission entity may be able to transmit OFDM symbol via 8 antennas.

Meanwhile, in the step S2040, the DL reception entity may be able to receive a DL signal (i.e., DL signal transmitted from the base station via the 8 antennas by being mapped to the N layers) transmitted from the base station in the step S2030.

In the step S2050, the DL reception entity may be able to process the DL signal received in the step S2040 using the specific precoding matrix selected from the previously stored codebook. As mentioned in the foregoing description, the DL transmission entity and the DL reception entity share the same codebook with each other. And, the codebook and specific precoding matrix, which are used in the step S2050, are identical to the codebook and specific precoding matrix used by the DL transmission entity in the step S2020, respectively.

Figure 21:
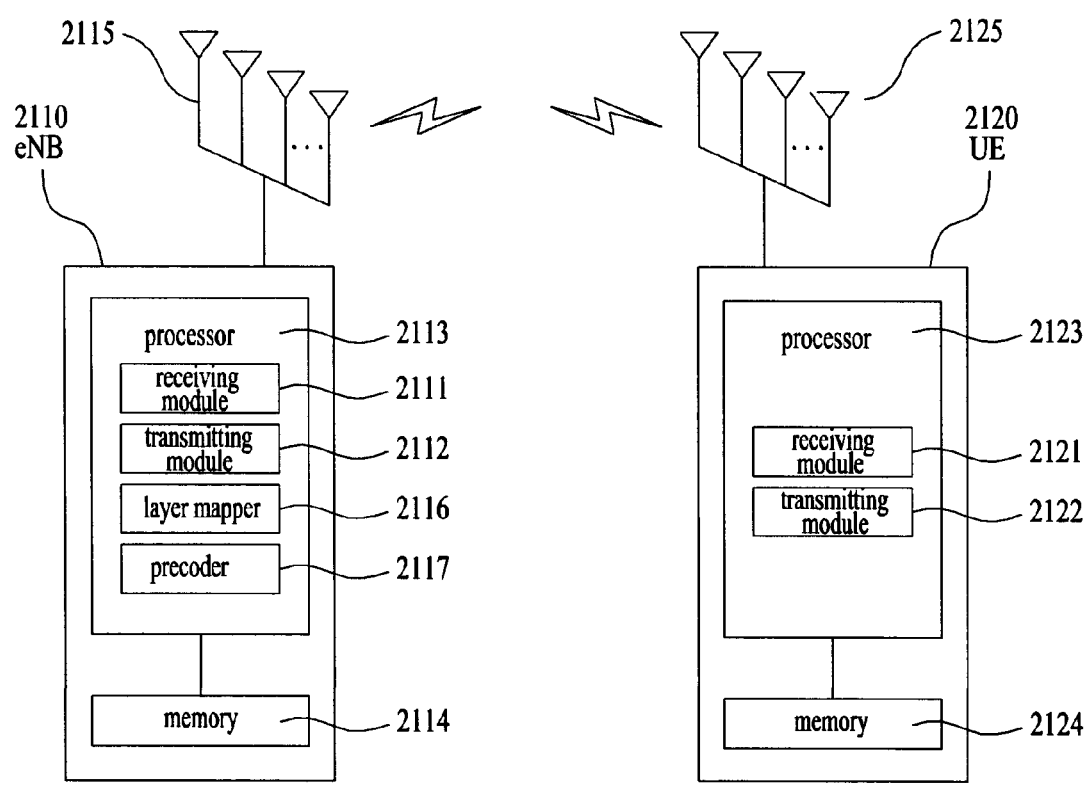
FIG. 21 is a diagram for a configuration of a base station device and a user equipment device according to a preferred embodiment of the present invention.

FIG. 21 is a diagram for a configuration of a base station device 2110 and a user equipment device 2120 according to a preferred embodiment of the present invention.

Referring to FIG. 21, a base station device (eNB) 2110 according to the present invention may include a processor 2113, a memory 2114 and a plurality of antennas 2115. In this case, a plurality of the antennas 2115 may mean a base station device that supports MIMO transmission and reception. The processor 2113 may include a receiving module 2111 and a transmitting module 2112. The receiving module 2111 may be able to receive various signals, data, information and the like in uplink from a user equipment. The transmitting module 2112 may be able to transmit various signals, data, information and the like in DL to the user equipment. Moreover, the processor 2113 may be configured to control overall operations of the base station device 2110.

The base station device 2110 according to one embodiment of the present invention may be configured to transmit a DL signal via the multi-antenna 2115. The multi-antenna 2115 may include 8 antennas and may be arrayed in various configurations (e.g., ULA configuration, cross polarized configuration, etc.). The memory 2114 of the base station device 2110 may be able to store a codebook. And, the codebook may be usable to transmit a signal mapped to at least one layer via the multi-antenna 2115. The processor 2113 of the base station device 2110 may be configured to process a DL signal transmission by being connected to the multi-antenna 2115 and the memory 2114.

The processor 2113 of the base station device 2110 may include a layer mapper 2116 configured to map a DL signal to N layers (where, 1≤N≤4), a precoder 2117 configured to precode the signal mapped to the N layers using a specific precoding matrix selected from a codebook stored n the memory 2114, and the transmitting module 2112 configured to perform a processing fro OFDM symbol configuration on the precoded signal and to transmit the processed signal via the multi-antenna 2115.

The processor 2113 of the base station device 2110 performs a function of operating information received by the user equipment device, information to be externally transmitted and the like. The memory 2114 may be able to store the operated information and the like for prescribed duration and may be substituted with such a component as a buffer (not shown in the drawing) and the like.

Referring to FIG. 21, a user equipment device (UE) 2120 according to the present invention may include a processor 2123, a memory 2124 and a plurality of antennas 2125. In this case, a plurality of the antennas 2125 may mean a user equipment device that supports MIMO transmission and reception. The processor 2123 may include a receiving module 2121 and a transmitting module 2122. The receiving module 2121 may be able to receive various signals, data, information and the like in downlink from the base station. The transmitting module 2122 may be able to transmit various signals, data, information and the like in UL to the base station. Moreover, the processor 2123 may be configured to control overall operations of the user equipment device 2120.

The user equipment device 2120 according to one embodiment of the present invention may be configured to receive a DL signal from the base station via the multi-antenna 2125. The memory 2124 of the user equipment device 2120 may be able to store a codebook used to process the DL signal from the base station. The processor 2123 of the user equipment device 2120 may be configured to process a DL signal transmission by being connected to the multi-antenna 2125 and the memory 2124. The processor 2123 of the user equipment device 2120 may be configured to process a DL received signal using a specific precoding matrix selected from the codebook stored in the memory 2124. In this case, the DL received signal is the signal received in a manner that the DL signal, which was mapped to the N layers (where, 1≤N≤4) by the base station and then transmitted via 8 antennas, is received via the receiving module 2121 of the user equipment device 2120.

The processor 2123 of the user equipment device 2120 performs a function of operating information received by the user equipment device, information to be externally transmitted and the like. The memory 2124 may be able to store the operated information and the like for prescribed duration and may be substituted with such a component as a buffer (not shown in the drawing) and the like.

The base station device 2110 and the user equipment device 2120 share the same codebook with each other. In particular, considering the configurations of the base station device 2110 and the user equipment device 2120, the codebook stored in the memory 2114 is identical to that stored in the memory 2124. The codebook may include precoding matrixes for the N ranks, respectively. The codebook consists of 16 codebook indexes. And, a portion of the precoding matrixes for higher ranks for the 16 codebook indexes may include precoding matrixes for low ranks. In the codebook, the precoding matrixes of the codebook indexes 1 to 8 for the rank 2 may have linear configuration, while the precoding matrixes for the codebook indexes 9 to 16 for the rank 2 may have block diagonal configuration. The precoding matrixes of the codebook indexes 1 to 8 for the rank 1 transmission may consist of different column vectors of a prescribed 8×8 matrix, respectively. And, the precoding matrixes of the codebook indexes 9 to 16 for the rank 1 transmission may consist of different column vectors of a matrix permutated from the prescribed 8×8 matrix, respectively. For instance, the codebook may include the former codebook shown in Table 4 proposed by the present invention.

The detailed configurations of the base station device and the user equipment device mentioned in the above description may be implemented in a manner that the descriptions of various embodiments of the present invention mentioned in the foregoing description are identically applicable.

In the description with reference to FIG. 21, the description of the base station device 2110 may be identically applicable to a relay device as a DL transmission entity or a UL reception entity. And, the description of the user equipment device 2120 may be identically applicable to a relay device as a DL reception entity or a UL transmission entity.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in he foregoing description may be applicable to various kinds of mobile communication systems.

What is claimed is:

1. A method of transmitting a downlink signal, which is transmitted by a base station using 8 antennas, comprising the steps of:

mapping the downlink signal to N layers ($1 \leq N \leq 4$);

precoding the signal mapped to the N layers using a specific precoding matrix selected from a previously stored codebook;

performing a processing for OFDM symbol configuration on the precoded signal; and transmitting OFDM symbol via the 8 antennas, wherein the previously stored codebook comprises precoding matrixes respectively corresponding to N ranks, wherein the previously stored codebook comprises 16 codebook indexes, wherein a portion of the precoding matrix for a high rank for each of the 16 codebook indexes comprises the precoding matrix for a low rank, wherein the previously stored codebook comprises

| Codebook Index | Rank 1 | Rank 2 | Rank3 |
|---|---|---|---|
| 1 | [$W_1(1)$] | [$W_1(1) \, W_1(2)$] | [$W_1(1) \, W_1(2) \, W_1(3)$] |
| 2 | [$W_1(2)$] | [$W_1(2) \, W_1(3)$] | [$W_1(2) \, W_1(3) \, W_1(4)$] |
| 3 | [$W_1(3)$] | [$W_1(3) \, W_1(4)$] | [$W_1(3) \, W_1(4) \, W_1(5)$] |
| 4 | [$W_1(4)$] | [$W_1(4) \, W_1(5)$] | [$W_1(4) \, W_1(5) \, W_1(6)$] |
| 5 | [$W_1(5)$] | [$W_1(5) \, W_1(6)$] | [$W_1(5) \, W_1(6) \, W_1(7)$] |
| 6 | [$W_1(6)$] | [$W_1(6) \, W_1(7)$] | [$W_1(6) \, W_1(7) \, W_1(8)$] |
| 7 | [$W_1(7)$] | [$W_1(7) \, W_1(8)$] | [$W_1(7) \, W_1(8) \, W_1(1)$] |
| 8 | [$W_1(8)$] | [$W_1(8) \, W_1(1)$] | [$W_1(8) \, W_1(1) \, W_1(2)$] |
| 9 | [$W_4(1)$] | [$W_2(1) \, W_2(2)$] | [$W_2(1) \, W_2(2) \, W_4(2)$] |
| 10 | [$W_4(2)$] | [$W_2(3) \, W_2(4)$] | [$W_2(3) \, W_2(4) \, W_4(4)$] |

-continued

| | | | |
|---|---|---|---|
| 11 | [W₄(3)] | [W₂(5) W₂(6)] | [W₂(5) W₂(6) W₄(6)] |
| 12 | [W₄(4)] | [W₂(7) W₂(8)] | [W₂(7) W₂(8) W₄(8)] |
| 13 | [W₄(5)] | [W₃(1) W₃(2)] | [W₃(1) W₃(2) W₄(1)] |
| 14 | [W₄(6)] | [W₃(3) W₃(4)] | [W₃(3) W₃(4) W₄(3)] |
| 15 | [W₄(7)] | [W₃(5) W₃(6)] | [W₃(5) W₃(6) W₄(5)] |
| 16 | [W₄(8)] | [W₃(7) W₃(8)] | [W₃(7) W₃(8) W₄(7)] |

| Codebook Index | Rank 4 |
|---|---|
| 1 | [W₁(1) W₁(2) W₁(3) W₁(4)] |
| 2 | [W₁(2) W₁(3) W₁(4) W₁(5)] |
| 3 | [W₁(3) W₁(4) W₁(5) W₁(6)] |
| 4 | [W₁(4) W₁(5) W₁(6) W₁(7)] |
| 5 | [W₁(5) W₁(6) W₁(7) W₁(8)] |
| 6 | [W₁(6) W₁(7) W₁(8) W₁(1)] |
| 7 | [W₁(7) W₁(8) W₁(1) W₁(2)] |
| 8 | [W₁(8) W₁(1) W₁(2) W₁(3)] |
| 9 | [W₂(1) W₂(2) W₂(3) W₂(4)] |
| 10 | [W₂(3) W₂(4) W₂(5) W₂(6)] |
| 11 | [W₂(5) W₂(6) W₂(7) W₂(8)] |
| 12 | [W₂(7) W₂(8) W₂(1) W₂(2)] |
| 13 | [W₃(1) W₃(2) W₃(3) W₃(4)] |
| 14 | [W₃(3) W₃(4) W₃(5) W₃(6)] |
| 15 | [W₃(5) W₃(6) W₃(7) W₃(8)] |
| 16 | [W₃(7) W₃(8) W₃(1) W₃(2)], | wherein $W_1$, $W_2$, $W_3$ and $W_4$ comprise $$W_1 = DFT_{8\times 8}$$

$$W_2 = P^T \begin{bmatrix} D_1 & 0 \\ 0 & D_1 \end{bmatrix} P,$$

where $D_1 = DFT_{4\times 4}$ $$W_3 = P^T \begin{bmatrix} D_2 & 0 \\ 0 & D_2 \end{bmatrix} P,$$

where $D_2 = \text{diag}[1, e^{\pi j/4}, e^{\pi j/2}, e^{3\pi j/4}] DFT_{4\times 4}$, and $$W_4 = P^T W_1,$$

wherein it is P=[$e_1$ $e_5$ $e_2$ $e_6$ $e_3$ $e_7$ $e_4$ $e_8$],
wherein $e_k$ ($1 \le k \le 8$) is a unitary vector having a non-zero value for a k-th element,
wherein $DFT_{4\times 4}$ and $DFT_{8\times 8}$ comprise $$DFT_{4\times 4} = \frac{1}{\sqrt{4}} \begin{bmatrix} 1 & 1 & 1 & 1 \\ 1 & j & -1 & -j \\ 1 & -1 & 1 & -1 \\ 1 & -j & -1 & j \end{bmatrix}$$

and $$DFT_{8\times 8} = \frac{1}{\sqrt{8}} \begin{bmatrix} w^0 & w^0 & w^0 & w^0 & w^0 & w^0 & w^0 & w^0 \\ w^0 & w^1 & w^2 & w^3 & w^4 & w^5 & w^6 & w^7 \\ w^0 & w^2 & w^4 & w^6 & w^8 & w^{10} & w^{12} & w^{14} \\ w^0 & w^3 & w^6 & w^9 & w^{12} & w^{15} & w^{18} & w^{21} \\ w^0 & w^4 & w^8 & w^{12} & w^{16} & w^{20} & w^{24} & w^{28} \\ w^0 & w^5 & w^{10} & w^{15} & w^{20} & w^{25} & w^{30} & w^{35} \\ w^0 & w^6 & w^{12} & w^{18} & w^{24} & w^{30} & w^{36} & w^{42} \\ w^0 & w^7 & w^{14} & w^{21} & w^{28} & w^{35} & w^{42} & w^{49} \end{bmatrix}$$

where, $$w = e^{-\frac{2\pi i}{8}},$$

respectively.

2. The method of claim 1, wherein the precoding matrixes of codebook indexes 1 to 8 for a rank 2 have linear configuration in the previously stored codebook and wherein the precoding matrixes of codebook indexes 9 to 16 for the rank 2 have block diagonal configuration in the previously stored codebook.

3. The method of claim 1, wherein the precoding matrixes of the codebook indexes 1 to 8 for a rank 1 transmission comprise different column vectors of a prescribed 8×8 matrix in the previously stored codebook, respectively and wherein the precoding matrixes of the codebook indexes 9 to 16 for the rank 1 transmission comprise different column vectors of a matrix permutated from the prescribed 8×8 matrix in the previously stored codebook, respectively.

4. A method of receiving a downlink signal, which is received from a base station by a user equipment, comprising the steps of:
  receiving the downlink signal transmitted via 8 antennas by being mapped to N layers ($1 \le N \le 4$) from the base station; and
  processing the received signal using a specific precoding matrix selected from a previously stored codebook,
  wherein the previously stored codebook comprises precoding matrixes respectively corresponding to N ranks,
  wherein the previously stored codebook comprises 16 codebook indexes,
  wherein a portion of the precoding matrix for a high rank for each of the 16 codebook indexes comprises the precoding matrix for a low rank,
  wherein the previously stored codebook comprises

| Codebook Index | Rank 1 | Rank 2 | Rank3 | Rank 4 |
|---|---|---|---|---|
| 1 | [W₁(1)] | [W₁(1) W₁(2)] | [W₁(1) W₁(2) W₁(3)] | [W₁(1) W₁(2) W₁(3) W₁(4)] |
| 2 | [W₁(2)] | [W₁(2) W₁(3)] | [W₁(2) W₁(3) W₁(4)] | [W₁(2) W₁(3) W₁(4) W₁(5)] |
| 3 | [W₁(3)] | [W₁(3) W₁(4)] | [W₁(3) W₁(4) W₁(5)] | [W₁(3) W₁(4) W₁(5) W₁(6)] |
| 4 | [W₁(4)] | [W₁(4) W₁(5)] | [W₁(4) W₁(5) W₁(6)] | [W₁(4) W₁(5) W₁(6) W₁(7)] |
| 5 | [W₁(5)] | [W₁(5) W₁(6)] | [W₁(5) W₁(6) W₁(7)] | [W₁(5) W₁(6) W₁(7) W₁(8)] |
| 6 | [W₁(6)] | [W₁(6) W₁(7)] | [W₁(6) W₁(7) W₁(8)] | [W₁(6) W₁(7) W₁(8) W₁(1)] |
| 7 | [W₁(7)] | [W₁(7) W₁(8)] | [W₁(7) W₁(8) W₁(1)] | [W₁(7) W₁(8) W₁(1) W₁(2)] |
| 8 | [W₁(8)] | [W₁(8) W₁(1)] | [W₁(8) W₁(1) W₁(2)] | [W₁(8) W₁(1) W₁(2) W₁(3)] |
| 9 | [W₄(1)] | [W₂(1) W₂(2)] | [W₂(1) W₂(2) W₄(2)] | [W₂(1) W₂(2) W₂(3) W₂(4)] |
| 10 | [W₄(2)] | [W₂(3) W₂(4)] | [W₂(3) W₂(4) W₄(4)] | [W₂(3) W₂(4) W₂(5) W₂(6)] |
| 11 | [W₄(3)] | [W₂(5) W₂(6)] | [W₂(5) W₂(6) W₄(6)] | [W₂(5) W₂(6) W₂(7) W₂(8)] |
| 12 | [W₄(4)] | [W₂(7) W₂(8)] | [W₂(7) W₂(8) W₄(8)] | [W₂(7) W₂(8) W₂(1) W₂(2)] |
| 13 | [W₄(5)] | [W₃(1) W₃(2)] | [W₃(1) W₃(2) W₄(1)] | [W₃(1) W₃(2) W₃(3) W₃(4)] |
| 14 | [W₄(6)] | [W₃(3) W₃(4)] | [W₃(3) W₃(4) W₄(3)] | [W₃(3) W₃(4) W₃(5) W₃(6)] |

-continued

| Codebook Index | Rank 1 | Rank 2 | Rank3 | Rank 4 |
|---|---|---|---|---|
| 15 | [$W_4(7)$] | [$W_3(5)\ W_3(6)$] | [$W_3(5)\ W_3(6)\ W_4(5)$] | [$W_3(5)\ W_3(6)\ W_3(7)\ W_3(8)$] |
| 16 | [$W_4(8)$] | [$W_3(7)\ W_3(8)$] | [$W_3(7)\ W_3(8)\ W_4(7)$] | [$W_3(7)\ W_3(8)\ W_3(1)\ W_3(2)$], | wherein $W_1$, $W_2$, $W_3$ and $W_4$ comprise $$W_1 = DFT_{8\times 8}$$

$$W_2 = P^T \begin{bmatrix} D_1 & 0 \\ 0 & D_1 \end{bmatrix} P,$$

where $D_1 = DFT_{4\times 4}$ $$W_3 = P^T \begin{bmatrix} D_2 & 0 \\ 0 & D_2 \end{bmatrix} P,$$

where $D_2 = \text{diag}[1, e^{\pi j/4}, e^{\pi j/2}, e^{3\pi j/4}]DFT_{4\times 4}$, and $$W_4 = P^T W_1,$$

wherein it is P=[$e_1\ e_5\ e_2\ e_6\ e_3\ e_7\ e_4\ e_8$], wherein $e_k$ ($1 \leq k \leq 8$) is a unitary vector having a non-zero value for a k-th element, wherein $DFT_{4\times 4}$ and $DFT_{8\times 8}$ comprise $$DFT_{4\times 4} = \frac{1}{\sqrt{4}} \begin{bmatrix} 1 & 1 & 1 & 1 \\ 1 & j & -1 & -j \\ 1 & -1 & 1 & -1 \\ 1 & -j & -1 & j \end{bmatrix}$$

and $$DFT_{8\times 8} = \frac{1}{\sqrt{8}} \begin{bmatrix} w^0 & w^0 & w^0 & w^0 & w^0 & w^0 & w^0 & w^0 \\ w^0 & w^1 & w^2 & w^3 & w^4 & w^5 & w^6 & w^7 \\ w^0 & w^2 & w^4 & w^6 & w^8 & w^{10} & w^{12} & w^{14} \\ w^0 & w^3 & w^6 & w^9 & w^{12} & w^{15} & w^{18} & w^{21} \\ w^0 & w^4 & w^8 & w^{12} & w^{16} & w^{20} & w^{24} & w^{28} \\ w^0 & w^5 & w^{10} & w^{15} & w^{20} & w^{25} & w^{30} & w^{35} \\ w^0 & w^6 & w^{12} & w^{18} & w^{24} & w^{30} & w^{36} & w^{42} \\ w^0 & w^7 & w^{14} & w^{21} & w^{28} & w^{35} & w^{42} & w^{49} \end{bmatrix}$$

where, $$w = e^{-\frac{2\pi i}{8}},$$

respectively.

5. The method of claim 4, wherein the precoding matrixes of codebook indexes 1 to 8 for a rank 2 have linear configuration in the previously stored codebook and wherein the precoding matrixes of codebook indexes 9 to 16 for the rank 2 have block diagonal configuration in the previously stored codebook.

6. The method of claim 4, wherein the precoding matrixes of the codebook indexes 1 to 8 for a rank 1 transmission comprise different column vectors of a prescribed 8×8 matrix in the previously stored codebook, respectively and wherein the precoding matrixes of the codebook indexes 9 to 16 for the rank 1 transmission comprise different column vectors of a matrix permutated from the prescribed 8×8 matrix in the previously stored codebook, respectively.

7. A base station device, which transmitting a downlink signal, comprising:
  8 antennas configured for signal transmission and reception;
  a memory storing a codebook used to transmit a signal mapped to at least one layer via the 8 antennas; and
  a processor configured to process a transmission of the downlink signal by being connected to the antennas and the memory, the processor comprising:
    a layer mapper mapping the downlink signal to N layers ($1 \leq N \leq 4$);
    a precoder precoding the signal mapped to the N layers using a specific precoding matrix selected from a previously stored codebook; and
    a transmitting module performing a processing for OFDM symbol configuration on the precoded signal, the transmitting module transmitting the processed signal via the 8 antennas,
  wherein the codebook comprises precoding matrixes respectively corresponding to N ranks,
  wherein the codebook comprises 16 codebook indexes,
  wherein a portion of the precoding matrix for a high rank for each of the 16 codebook indexes comprises the precoding matrix for a low rank,
  wherein the codebook comprises

| Codebook Index | Rank 1 | Rank 2 | Rank3 | Rank 4 |
|---|---|---|---|---|
| 1 | [$W_1(1)$] | [$W_1(1)\ W_1(2)$] | [$W_1(1)\ W_1(2)\ W_1(3)$] | [$W_1(1)\ W_1(2)\ W_1(3)\ W_1(4)$] |
| 2 | [$W_1(2)$] | [$W_1(2)\ W_1(3)$] | [$W_1(2)\ W_1(3)\ W_1(4)$] | [$W_1(2)\ W_1(3)\ W_1(4)\ W_1(5)$] |
| 3 | [$W_1(3)$] | [$W_1(3)\ W_1(4)$] | [$W_1(3)\ W_1(4)\ W_1(5)$] | [$W_1(3)\ W_1(4)\ W_1(5)\ W_1(6)$] |
| 4 | [$W_1(4)$] | [$W_1(4)\ W_1(5)$] | [$W_1(4)\ W_1(5)\ W_1(6)$] | [$W_1(4)\ W_1(5)\ W_1(6)\ W_1(7)$] |
| 5 | [$W_1(5)$] | [$W_1(5)\ W_1(6)$] | [$W_1(5)\ W_1(6)\ W_1(7)$] | [$W_1(5)\ W_1(6)\ W_1(7)\ W_1(8)$] |
| 6 | [$W_1(6)$] | [$W_1(6)\ W_1(7)$] | [$W_1(6)\ W_1(7)\ W_1(8)$] | [$W_1(6)\ W_1(7)\ W_1(8)\ W_1(1)$] |
| 7 | [$W_1(7)$] | [$W_1(7)\ W_1(8)$] | [$W_1(7)\ W_1(8)\ W_1(1)$] | [$W_1(7)\ W_1(8)\ W_1(1)\ W_1(2)$] |
| 8 | [$W_1(8)$] | [$W_1(8)\ W_1(1)$] | [$W_1(8)\ W_1(1)\ W_1(2)$] | [$W_1(8)\ W_1(1)\ W_1(2)\ W_1(3)$] |
| 9 | [$W_4(1)$] | [$W_2(1)\ W_2(2)$] | [$W_2(1)\ W_2(2)\ W_4(2)$] | [$W_2(1)\ W_2(2)\ W_2(3)\ W_2(4)$] |
| 10 | [$W_4(2)$] | [$W_2(3)\ W_2(4)$] | [$W_2(3)\ W_2(4)\ W_4(4)$] | [$W_2(3)\ W_2(4)\ W_2(5)\ W_2(6)$] |
| 11 | [$W_4(3)$] | [$W_2(5)\ W_2(6)$] | [$W_2(5)\ W_2(6)\ W_4(6)$] | [$W_2(5)\ W_2(6)\ W_2(7)\ W_2(8)$] |
| 12 | [$W_4(4)$] | [$W_2(7)\ W_2(8)$] | [$W_2(7)\ W_2(8)\ W_4(8)$] | [$W_2(7)\ W_2(8)\ W_2(1)\ W_2(2)$] |

-continued

| Codebook Index | Rank 1 | Rank 2 | Rank3 | Rank 4 |
|---|---|---|---|---|
| 13 | [$W_4(5)$] | [$W_3(1)\ W_3(2)$] | [$W_3(1)\ W_3(2)\ W_4(1)$] | [$W_3(1)\ W_3(2)\ W_3(3)\ W_3(4)$] |
| 14 | [$W_4(6)$] | [$W_3(3)\ W_3(4)$] | [$W_3(3)\ W_3(4)\ W_4(3)$] | [$W_3(3)\ W_3(4)\ W_3(5)\ W_3(6)$] |
| 15 | [$W_4(7)$] | [$W_3(5)\ W_3(6)$] | [$W_3(5)\ W_3(6)\ W_4(5)$] | [$W_3(5)\ W_3(6)\ W_3(7)\ W_3(8)$] |
| 16 | [$W_4(8)$] | [$W_3(7)\ W_3(8)$] | [$W_3(7)\ W_3(8)\ W_4(7)$] | [$W_3(7)\ W_3(8)\ W_3(1)\ W_3(2)$], | wherein $W_1$, $W_2$, $W_3$ and $W_4$ comprise $$W_1 = DFT_{8\times 8}$$

$$W_2 = P^T \begin{bmatrix} D_1 & 0 \\ 0 & D_1 \end{bmatrix} P,$$

where $D_1 = DFT_{4\times 4}$ $$W_3 = P^T \begin{bmatrix} D_2 & 0 \\ 0 & D_2 \end{bmatrix} P,$$

where $D_2 = \text{diag}[1, e^{\pi j/4}, e^{\pi j/2}, e^{3\pi j/4}] DFT_{4\times 4}$, and $$W_4 = P^T W_1,$$

wherein it is P=[$e_1\ e_5\ e_2\ e_6\ e_3\ e_7\ e_4\ e_8$],
wherein $e_k$ ($1 \leq k \leq 8$) is a unitary vector having a non-zero value for a k-th element,
wherein $DFT_{4\times 4}$ and $DFT_{8\times 8}$ comprise $$DFT_{4\times 4} = \frac{1}{\sqrt{4}} \begin{bmatrix} 1 & 1 & 1 & 1 \\ 1 & j & -1 & -j \\ 1 & -1 & 1 & -1 \\ 1 & -j & -1 & j \end{bmatrix}$$

and $$DFT_{8\times 8} = \frac{1}{\sqrt{8}} \begin{bmatrix} w^0 & w^0 & w^0 & w^0 & w^0 & w^0 & w^0 & w^0 \\ w^0 & w^1 & w^2 & w^3 & w^4 & w^5 & w^6 & w^7 \\ w^0 & w^2 & w^4 & w^6 & w^8 & w^{10} & w^{12} & w^{14} \\ w^0 & w^3 & w^6 & w^9 & w^{12} & w^{15} & w^{18} & w^{21} \\ w^0 & w^4 & w^8 & w^{12} & w^{16} & w^{20} & w^{24} & w^{28} \\ w^0 & w^5 & w^{10} & w^{15} & w^{20} & w^{25} & w^{30} & w^{35} \\ w^0 & w^6 & w^{12} & w^{18} & w^{24} & w^{30} & w^{36} & w^{42} \\ w^0 & w^7 & w^{14} & w^{21} & w^{28} & w^{35} & w^{42} & w^{49} \end{bmatrix}$$

-continued where, $$w = e^{-\frac{2\pi i}{8}},$$

respectively.

8. A user equipment device, which receives a downlink signal from a base station, comprising:

a signal transceiving antenna;

a memory storing a codebook used to receive the downlink signal transmitted via 8 antennas by being mapped to N layers ($1 \leq N \leq 4$) from the base station; and a processor processing a reception of the downlink signal by being connected to the antenna and the memory, the processor configured to process the received signal using a specific precoding matrix selected from a codebook stored in the memory, wherein the codebook comprises precoding matrixes respectively corresponding to N ranks, wherein the previously stored codebook comprises 16 codebook indexes, wherein a portion of the precoding matrix for a high rank for each of the 16 codebook indexes comprises the precoding matrix for a low rank, wherein 'the previously stored codebook comprises

| Codebook Index | Rank 1 | Rank 2 | Rank3 | Rank 4 |
|---|---|---|---|---|
| 1 | [$W_1(1)$] | [$W_1(1)\ W_1(2)$] | [$W_1(1)\ W_1(2)\ W_1(3)$] | [$W_1(1)\ W_1(2)\ W_1(3)\ W_1(4)$] |
| 2 | [$W_1(2)$] | [$W_1(2)\ W_1(3)$] | [$W_1(2)\ W_1(3)\ W_1(4)$] | [$W_1(2)\ W_1(3)\ W_1(4)\ W_1(5)$] |
| 3 | [$W_1(3)$] | [$W_1(3)\ W_1(4)$] | [$W_1(3)\ W_1(4)\ W_1(5)$] | [$W_1(3)\ W_1(4)\ W_1(5)\ W_1(6)$] |
| 4 | [$W_1(4)$] | [$W_1(4)\ W_1(5)$] | [$W_1(4)\ W_1(5)\ W_1(6)$] | [$W_1(4)\ W_1(5)\ W_1(6)\ W_1(7)$] |
| 5 | [$W_1(5)$] | [$W_1(5)\ W_1(6)$] | [$W_1(5)\ W_1(6)\ W_1(7)$] | [$W_1(5)\ W_1(6)\ W_1(7)\ W_1(8)$] |
| 6 | [$W_1(6)$] | [$W_1(6)\ W_1(7)$] | [$W_1(6)\ W_1(7)\ W_1(8)$] | [$W_1(6)\ W_1(7)\ W_1(8)\ W_1(1)$] |
| 7 | [$W_1(7)$] | [$W_1(7)\ W_1(8)$] | [$W_1(7)\ W_1(8)\ W_1(1)$] | [$W_1(7)\ W_1(8)\ W_1(1)\ W_1(2)$] |
| 8 | [$W_1(8)$] | [$W_1(8)\ W_1(1)$] | [$W_1(8)\ W_1(1)\ W_1(2)$] | [$W_1(8)\ W_1(1)\ W_1(2)\ W_1(3)$] |
| 9 | [$W_4(1)$] | [$W_2(1)\ W_2(2)$] | [$W_2(1)\ W_2(2)\ W_4(2)$] | [$W_2(1)\ W_2(2)\ W_2(3)\ W_2(4)$] |
| 10 | [$W_4(2)$] | [$W_2(3)\ W_2(4)$] | [$W_2(3)\ W_2(4)\ W_4(4)$] | [$W_2(3)\ W_2(4)\ W_2(5)\ W_2(6)$] |
| 11 | [$W_4(3)$] | [$W_2(5)\ W_2(6)$] | [$W_2(5)\ W_2(6)\ W_4(6)$] | [$W_2(5)\ W_2(6)\ W_2(7)\ W_2(8)$] |
| 12 | [$W_4(4)$] | [$W_2(7)\ W_2(8)$] | [$W_2(7)\ W_2(8)\ W_4(8)$] | [$W_2(7)\ W_2(8)\ W_2(1)\ W_2(2)$] |
| 13 | [$W_4(5)$] | [$W_3(1)\ W_3(2)$] | [$W_3(1)\ W_3(2)\ W_4(1)$] | [$W_3(1)\ W_3(2)\ W_3(3)\ W_3(4)$] |
| 14 | [$W_4(6)$] | [$W_3(3)\ W_3(4)$] | [$W_3(3)\ W_3(4)\ W_4(3)$] | [$W_3(3)\ W_3(4)\ W_3(5)\ W_3(6)$] |

-continued

| Codebook Index | Rank 1 | Rank 2 | Rank3 | Rank 4 |
|---|---|---|---|---|
| 15 | [$W_4(7)$] | [$W_3(5)\ W_3(6)$] | [$W_3(5)\ W_3(6)\ W_4(5)$] | [$W_3(5)\ W_3(6)\ W_3(7)\ W_3(8)$] |
| 16 | [$W_4(8)$] | [$W_3(7)\ W_3(8)$] | [$W_3(7)\ W_3(8)\ W_4(7)$] | [$W_3(7)\ W_3(8)\ W_3(1)\ W_3(2)$], | wherein $W_1$, $W_2$, $W_3$ and $W_4$ comprise $$W_1 = DFT_{8\times 8}$$

$$W_2 = P^T \begin{bmatrix} D_1 & 0 \\ 0 & D_1 \end{bmatrix} P,$$

where $D_1 = DFT_{4\times 4}$ $$W_3 = P^T \begin{bmatrix} D_2 & 0 \\ 0 & D_2 \end{bmatrix} P,$$

where $D_2 = \text{diag}[1,\ e^{\pi j/4},\ e^{\pi j/2},\ e^{3\pi j/4}] DFT_{4\times 4}$, and $$W_4 = P^T W_1,$$

wherein it is $P = [e_1\ e_5\ e_2\ e_6\ e_3\ e_7\ e_4\ e_8]$,
wherein $e_k$ ($1 \leq k \leq 8$) is a unitary vector having a non-zero value for a k-th element,
wherein $DFT_{4\times 4}$ and $DFT_{8\times 8}$ comprise $$DFT_{4\times 4} = \frac{1}{\sqrt{4}} \begin{bmatrix} 1 & 1 & 1 & 1 \\ 1 & j & -1 & -j \\ 1 & -1 & 1 & -1 \\ 1 & -j & -1 & j \end{bmatrix}$$

and $$DFT_{8\times 8} = \frac{1}{\sqrt{8}} \begin{bmatrix} w^0 & w^0 & w^0 & w^0 & w^0 & w^0 & w^0 & w^0 \\ w^0 & w^1 & w^2 & w^3 & w^4 & w^5 & w^6 & w^7 \\ w^0 & w^2 & w^4 & w^6 & w^8 & w^{10} & w^{12} & w^{14} \\ w^0 & w^3 & w^6 & w^9 & w^{12} & w^{15} & w^{18} & w^{21} \\ w^0 & w^4 & w^8 & w^{12} & w^{16} & w^{20} & w^{24} & w^{28} \\ w^0 & w^5 & w^{10} & w^{15} & w^{20} & w^{25} & w^{30} & w^{35} \\ w^0 & w^6 & w^{12} & w^{18} & w^{24} & w^{30} & w^{36} & w^{42} \\ w^0 & w^7 & w^{14} & w^{21} & w^{28} & w^{35} & w^{42} & w^{49} \end{bmatrix}$$

where, $$w = e^{-\frac{2\pi i}{8}},$$

respectively.

* * * * *